United States Patent [19]
Baugh

[11] 3,924,446
[45] Dec. 9, 1975

[54] UNDERWATER CONNECTION APPARATUS
[76] Inventor: Benton F. Baugh, 9050 Longpoint, Houston, Tex. 77055
[22] Filed: Nov. 22, 1974
[21] Appl. No.: 526,100

Related U.S. Application Data
[62] Division of Ser. No. 386,431, Aug. 7, 1973, Pat. No. 3,866,677.

[52] U.S. Cl. .................................................. 73/37
[51] Int. Cl.² ........................................ G01M 3/02
[58] Field of Search .......... 73/49.5, 49.6, 49.1, 420, 73/40.5, 37, 37.5, 432 R; 166/.5, .6

[56] References Cited
UNITED STATES PATENTS
3,848,458   11/1974   Soya................................. 73/40.5 R

*Primary Examiner*—Donald O. Woodiel

[57] ABSTRACT

An improved underwater connection apparatus is provided for selectively making fluid connection between a Christmas tree flowline and a flowline extending underwater from surface storage facilities, the storage flowline being pulled into a position of partial alignment with the Christmas tree flowline by a wireline device and completely axially aligned by a remotely operable hydraulic mechanism, the two flowlines being thereafter secured together for fluid transfer.

8 Claims, 27 Drawing Figures

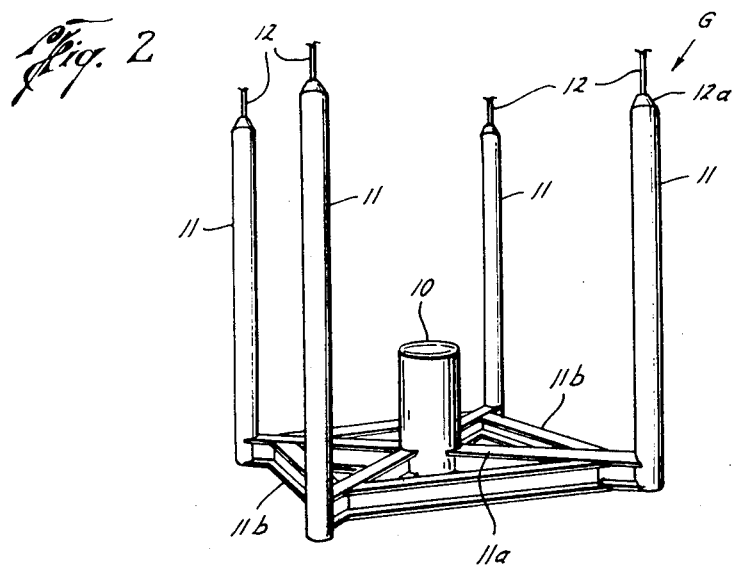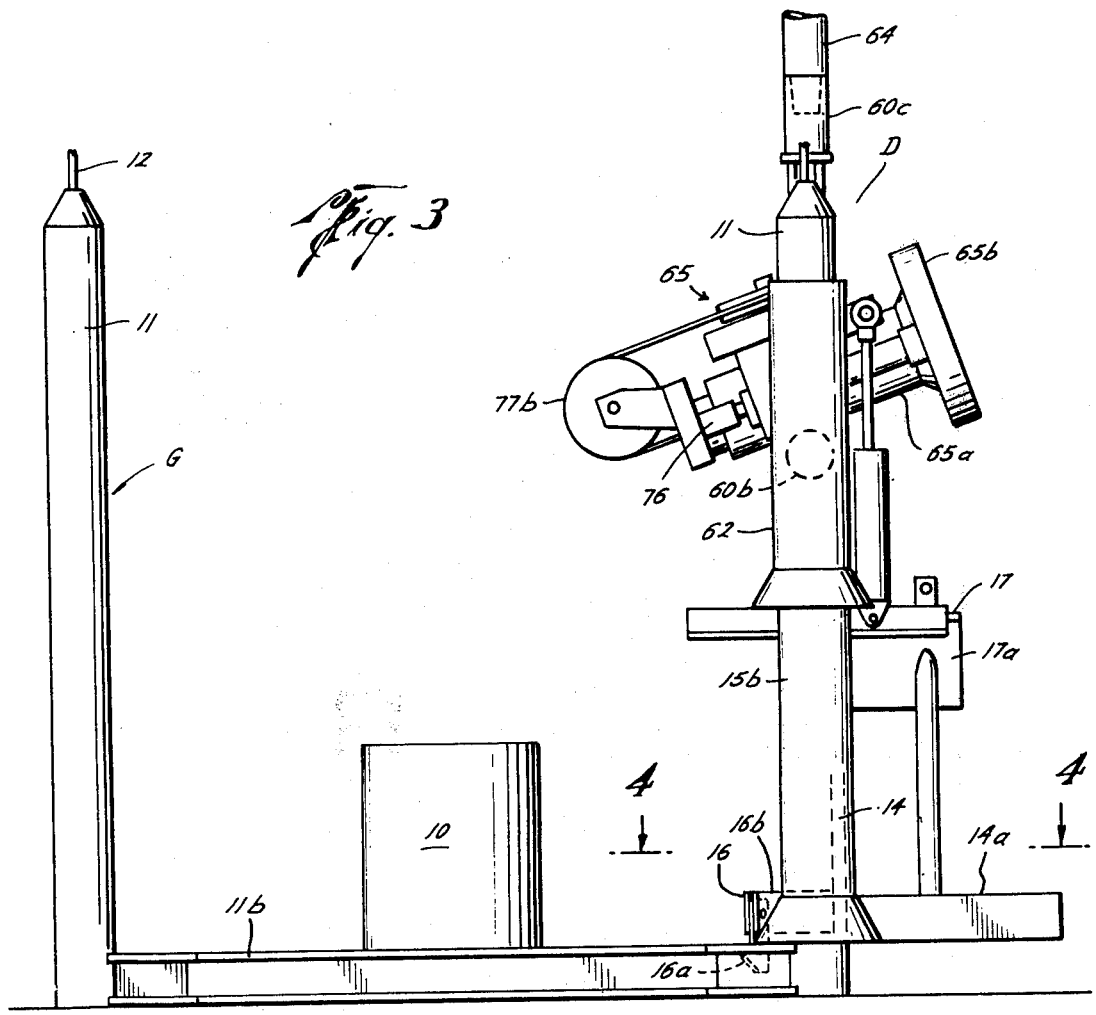

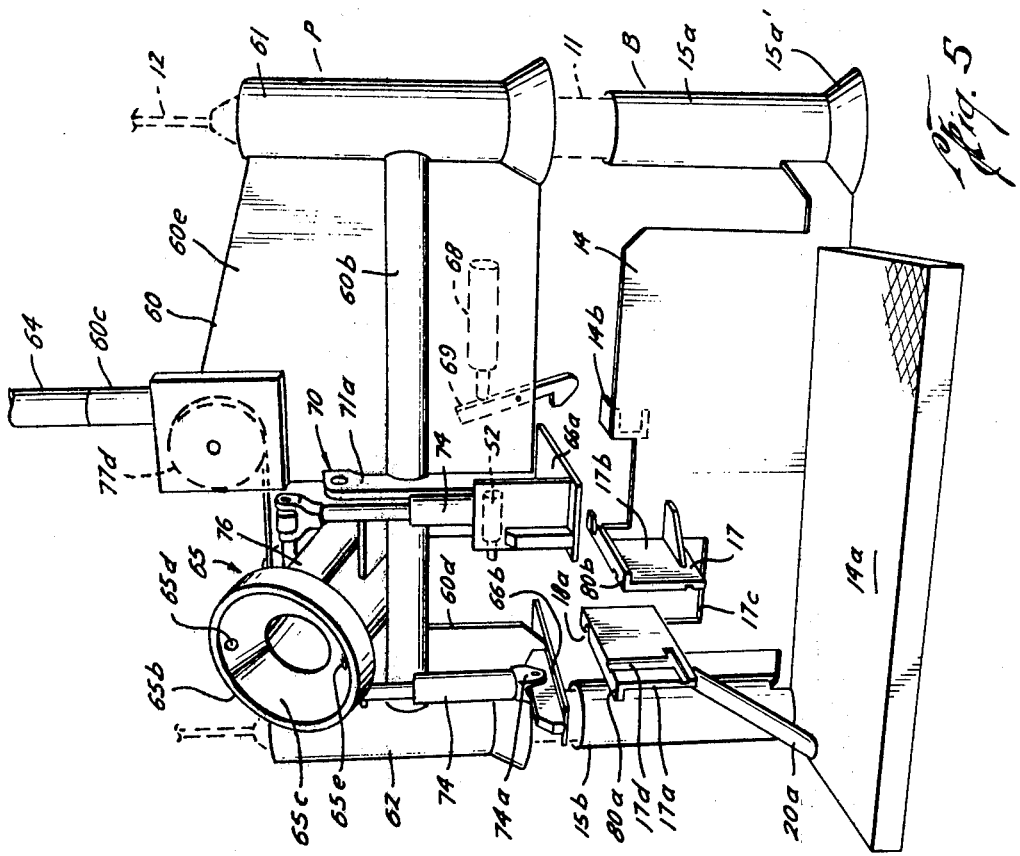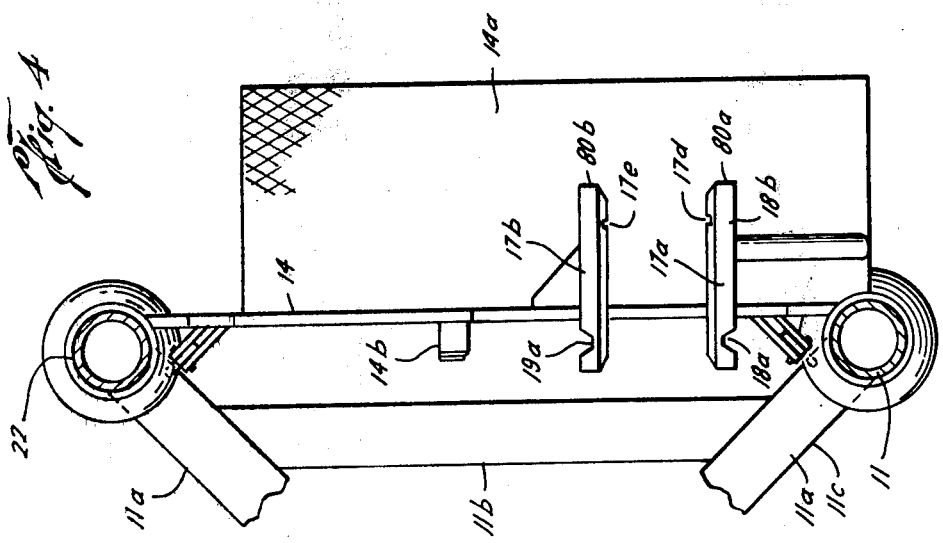

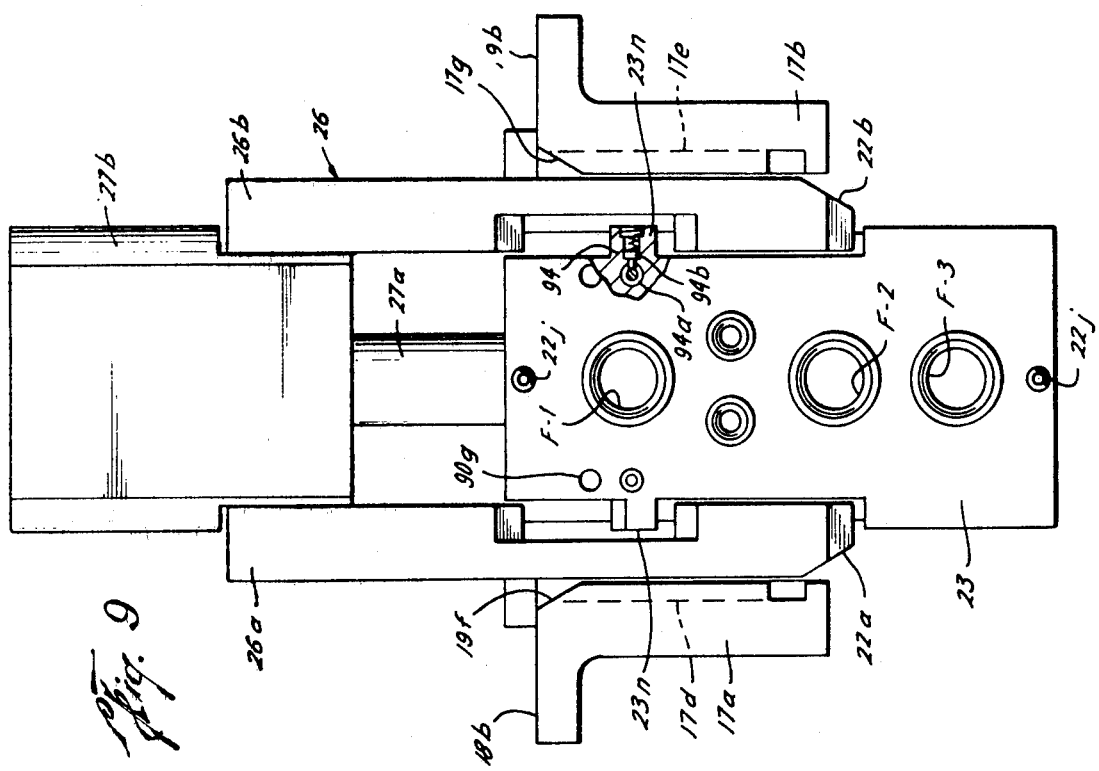
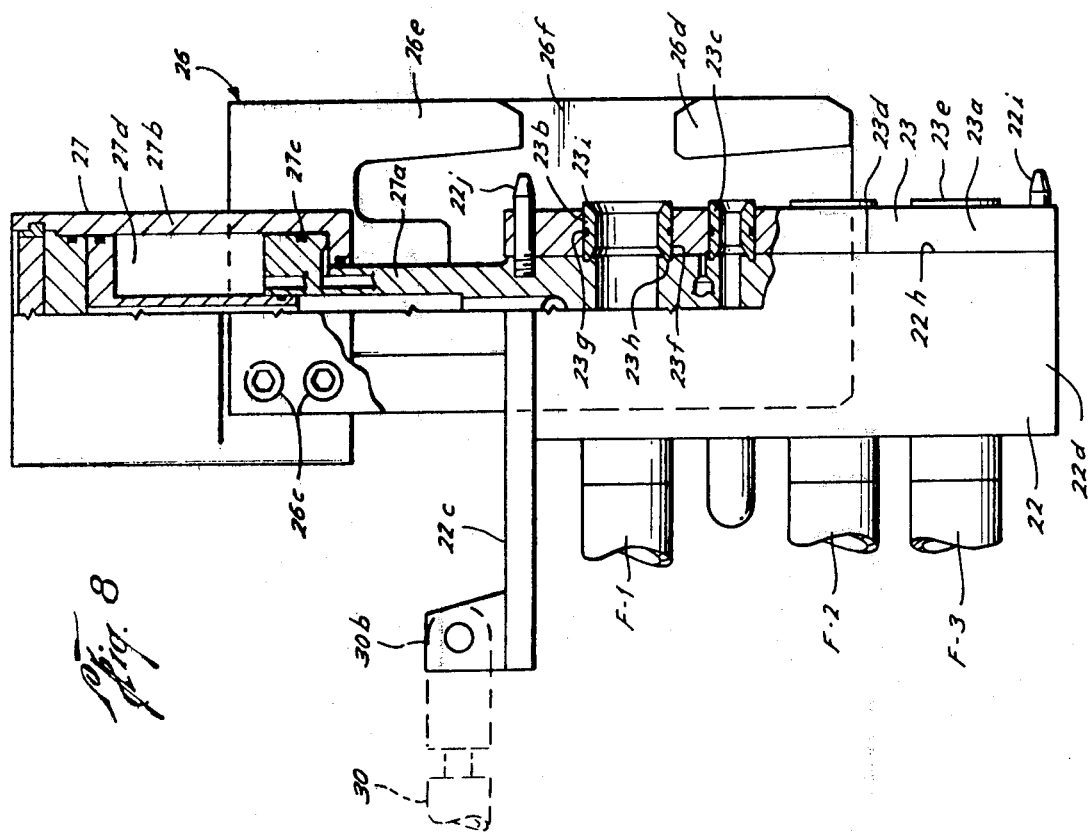

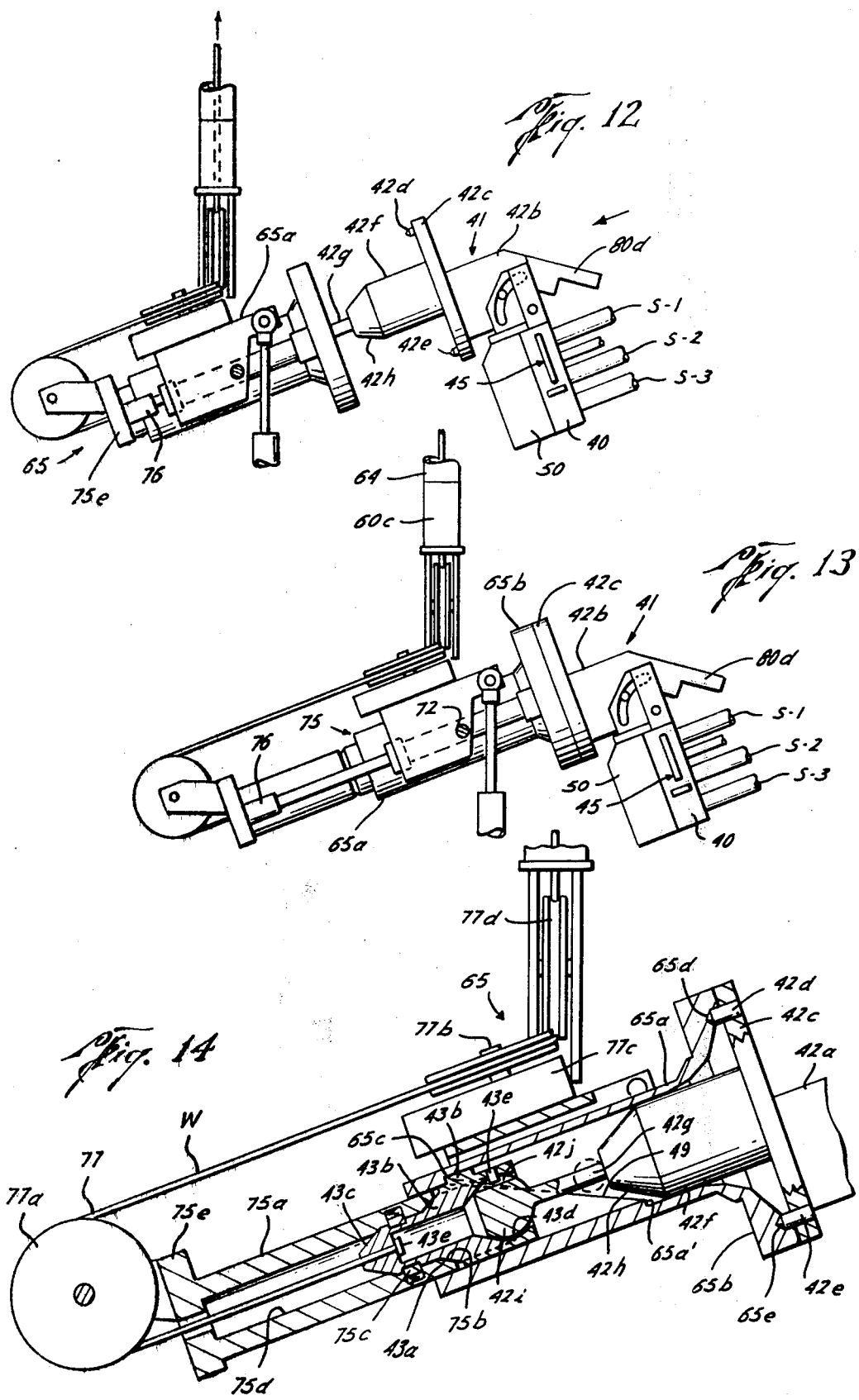

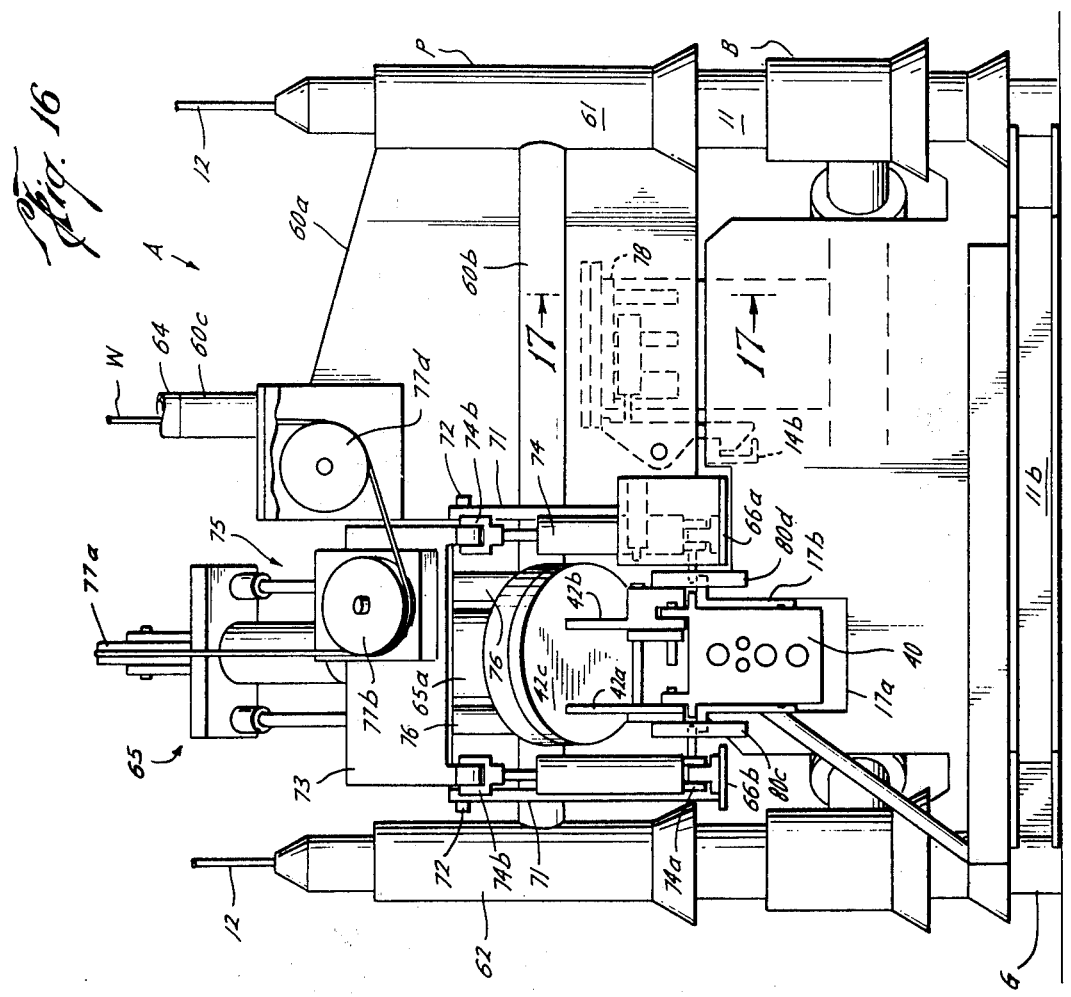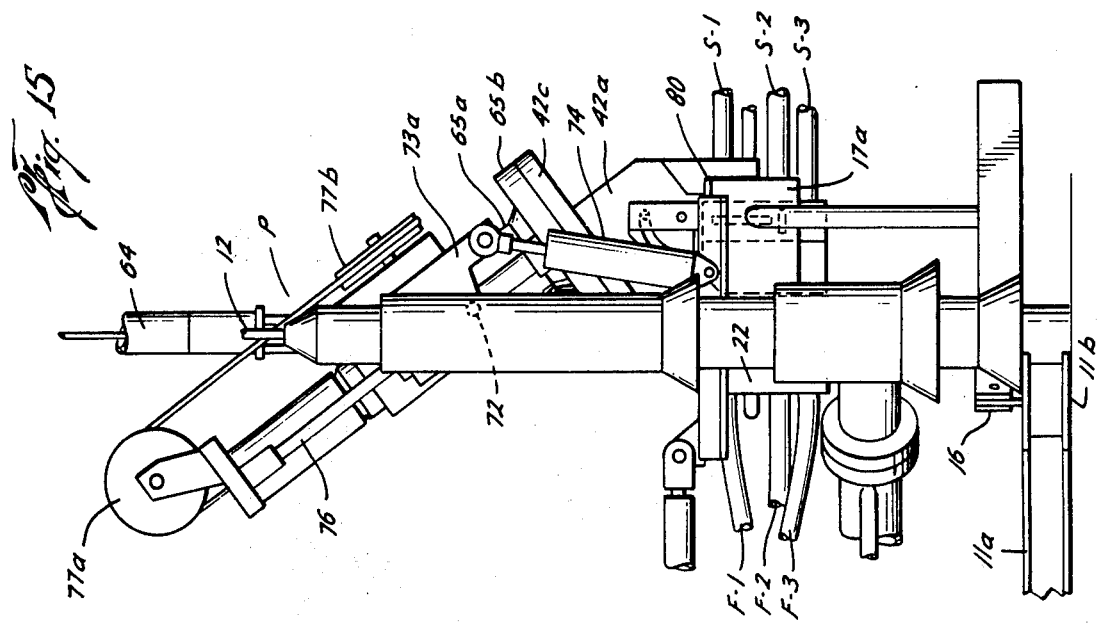

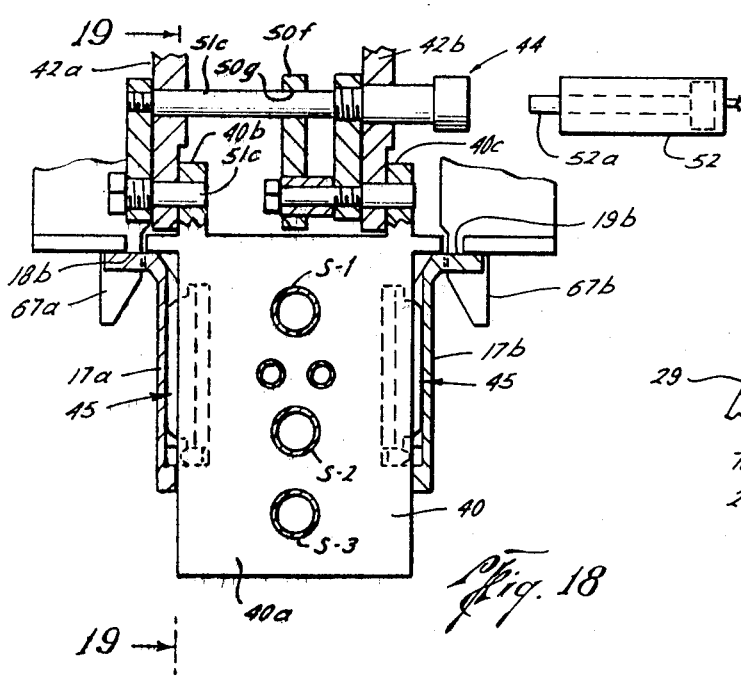
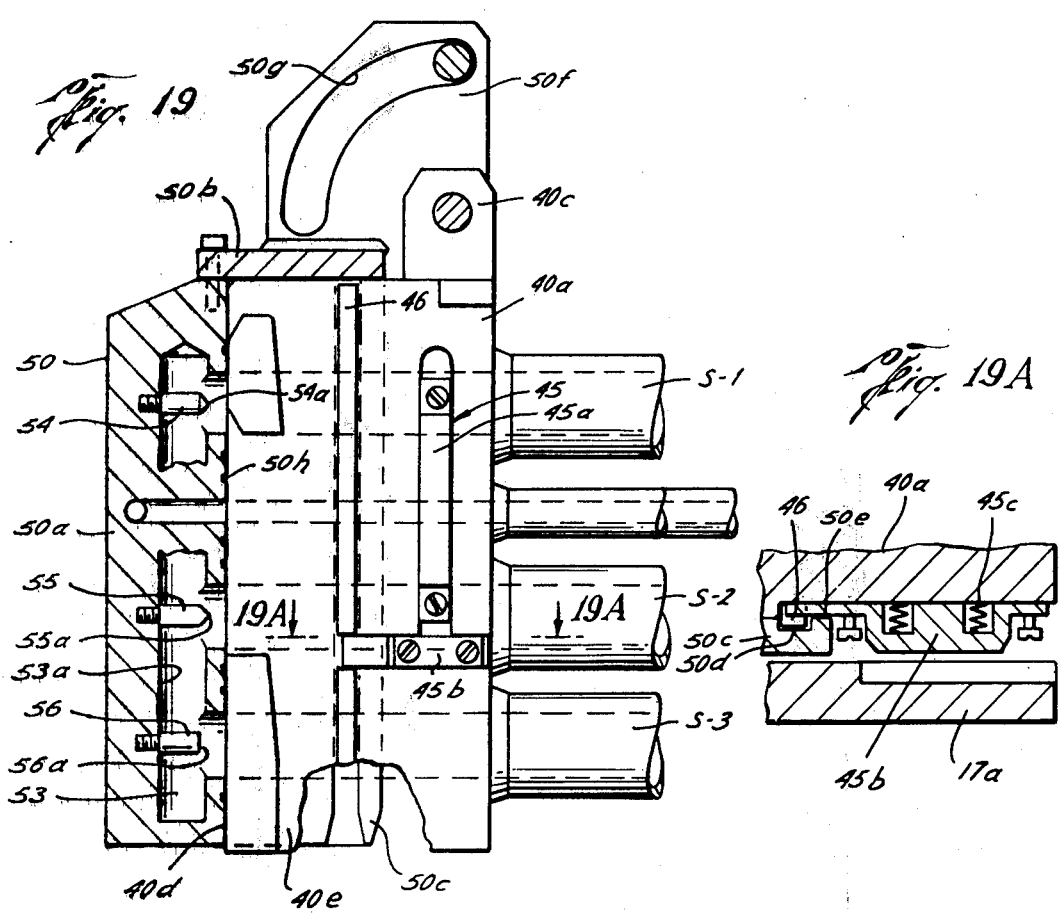

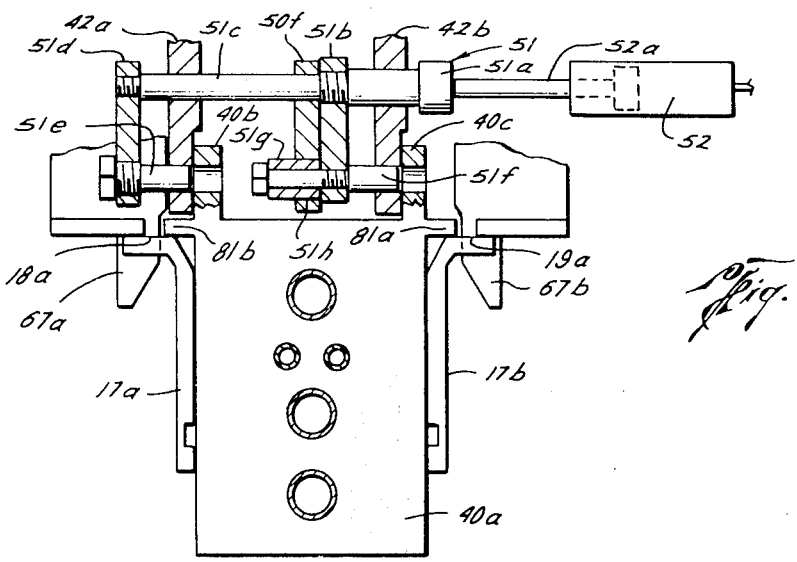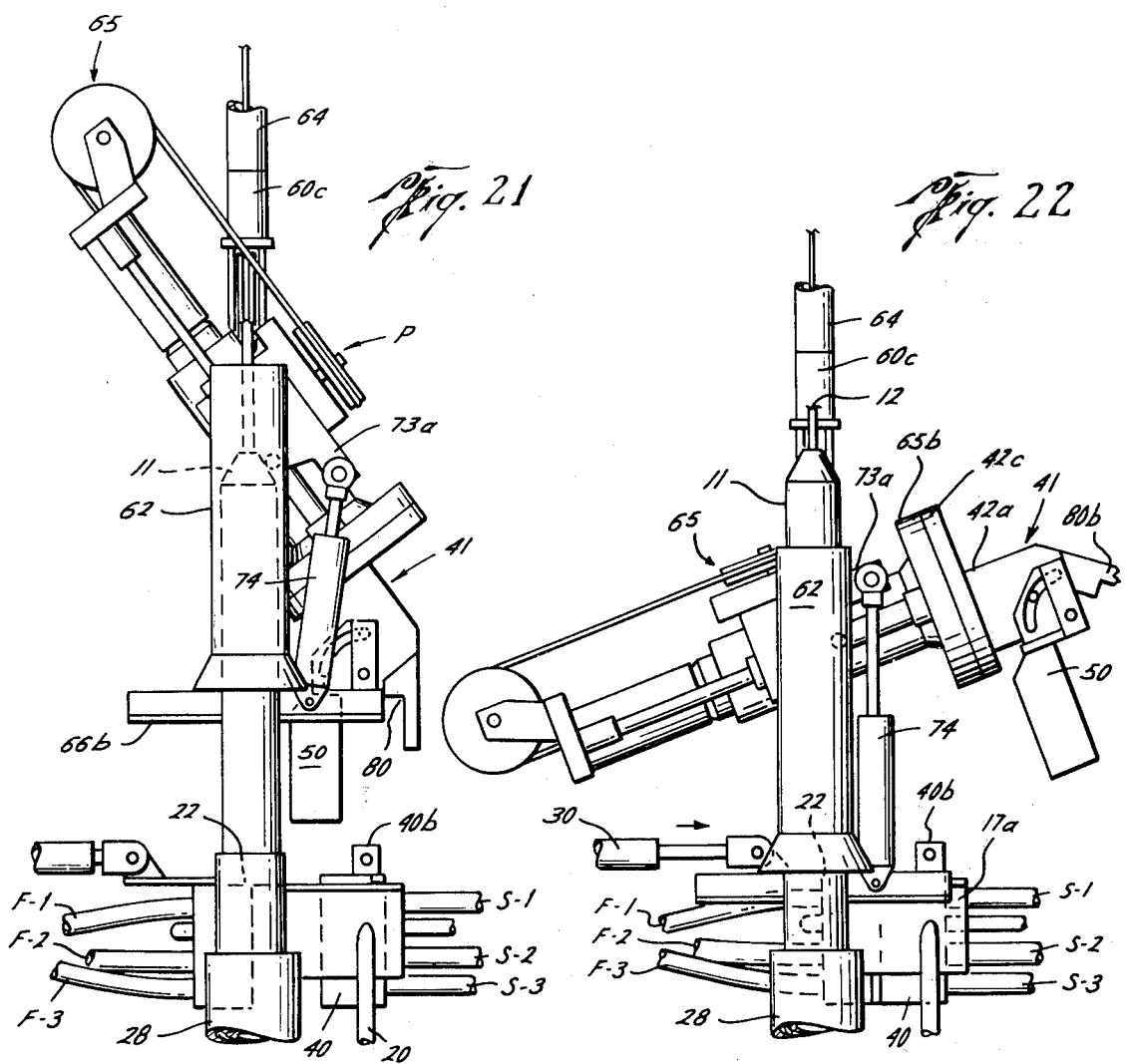

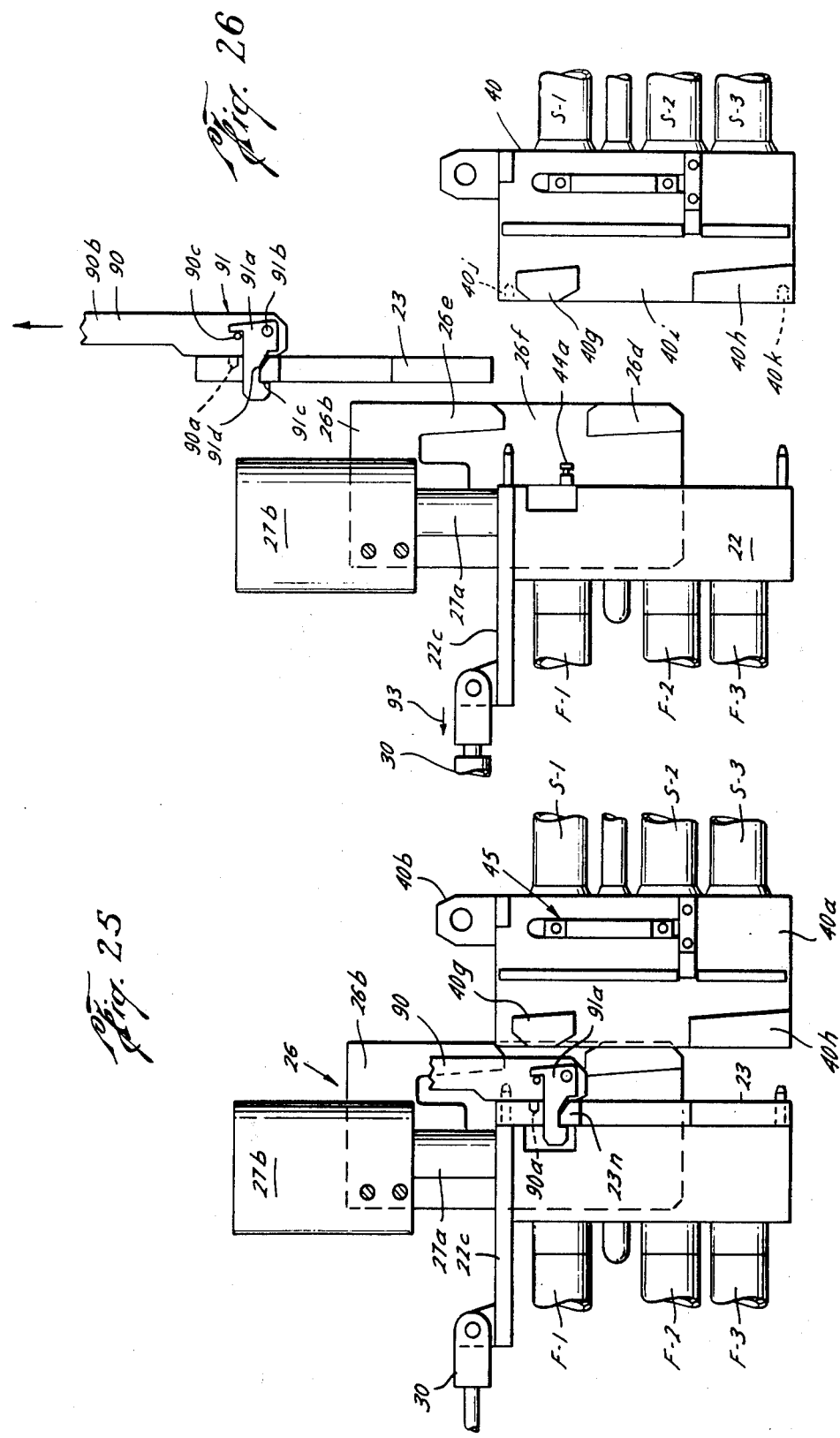

UNDERWATER CONNECTION APPARATUS

CROSS REFERENCE TO RELATED APPLICATION

This application is a divisional of U.S. Pat. application, Ser. No. 386,421, filed Aug. 7, 1973, now U.S. Pat. No. 3,866,677.

BACKGROUND OF THE INVENTION

This invention relates to the completion of subsea wells for the transfer of well fluid from the well to the surface.

U.S. Pat. No. 3,721,294, issued to Nelson, discloses an underwater pipe connection apparatus for connecting a Christmas tree flowline on a subsea well to a flowline which has been laid from a storage facility downwardly to the oil well. One of the purposes of the connection apparatus of the Nelson patent is to permit the use of a standard, less expensive guide structure which has guidelines extending upwardly from the well to the operating vessel at the surface. The apparatus of the Nelson patent includes a pulling device having two funnels with wirelines passing therethrough into connection with the surface vessel and the storage flowline so that the flowline can be pulled into alignment for connection with the Christmas tree flowline.

SUMMARY OF THE INVENTION

It is an object of this invention to provide a new and improved apparatus for selectively making fluid connection to a well drilled into a formation underlying a body of water wherein a storage flowline is accurately positioned for alignment with a Christmas tree flowline by a combination of wireline apparatus and hydraulic apparatus controlled on the surface. The apparatus of the preferred embodiment of this invention includes a well guide structure for mounting on a well such that the well guide structure includes guidelines which extend upwardly to the surface. A well fluid flow control network or Christmas tree is positioned onto the well guide structure for controlling the flow of well fluid outwardly of the well. A storage flowline is laid from a lay barge to a position adjacent the well and wireline positioning means attached to the storage flowline is lowered downwardly along the guidelines to the well. The wireline positioning means is provided with means for moving the storage flowline to a position of partial alignment with respect to the Christmas tree flowline. Hydraulic power means remotely operable from the surface is provided for engaging and moving the storage flowline from the position of partial alignment to a position of substantially complete alignment with the Christmas tree flowline, so that a sealed, fluid connection can be made between the two flowlines.

The underwater connection apparatus of this invention further includes a flowline pulling tool which includes means for running to the well from the surface a flowline alignment assembly adapted to receive the Christmas tree flowline and storage flowline in axial alignment for connection. The flow-line pulling tool further includes a funnel assembly having a wireline passing therethrough into attachment with the storage flowline whereby the position of the flowline is controlled by movement of the wireline, which is controlled at the surface. The funnel assembly cooperates with the wireline to move the storage flowline into a position of partial alignment with the Christmas tree. Thereafter, the remotely operable power means attaches to the storage flowline and moves the storage flowline into a locked position in the funnel assembly so that the flowline is pivotal wth the funnel assembly. The funnel assembly is pivoted downwardly with the storage flowline attached thereto to a position where the storage flowline is in complete, axial alignment with the Christmas tree flowline.

Connection means are provided for making a sealed fluid connection between the completely aligned Christmas tree flowline and storage flowline. Prior to connection of the two flowlines, independent test means are provided for testing the storage flowline, the independent testing means being thereafter removable from the storage flowline so that the storage flowline can be connected with the Christmas tree flowline. The independent testing means and the flowline pulling tool are removed from the well site after a sealed, fluid connection has been made between the Christmas tree flowline and the storage flowline.

Hydraulic terminal connections are provided in the flowline positioning assembly for hydraulically controlling the means for making connection between the aligned flowlines, thereby allowing the Christmas tree to be run and capped from the surface vessel and eliminating the need for re-entry of the Christmas tree manifold to control the means for connecting the flowlines. The Christmas tree flowline includes a flowline flange into which the Christmas tree flowlines terminate. The flowline flange has mounted thereon a seal assembly for making the sealed, fluid connection between the Christmas tree flowline flange and a flowline flange on the storage flowline. The seal assembly is removable by means of a running tool whereby the seal assembly can be replaced if desired.

These features and objects of this invention, as well as additional meritorious features, will be pointed out in the detailed description to follow.

BRIEF DESCRIPTION OF THE DRAWINGS

FIG. 2 is an isometric view of the well guide structure adapted for mounting on the subsea oil well which has been drilled into a formation underlying a body of water;

FIG. 3 is a side view illustrating the running of the flowline alignment assembly downwardly into positioned on the well guide structure by means of the flowline positioning or pulling tool;

FIG. 4 is a sectional view taken along line 4—4 of FIG. 3 illustrating the latching of the flowline alignment assembly to the well guide structure;

FIG. 5 is an isometric view of the release of the flowline positioning tool from the flowline alignment assembly;

FIG. 8 is a side view partially in section taken along line 8—8 of FIG. 7 of the hydraulically operated connection means for making connection between the fully aligned Christmas tree flange and storage flowline flange;

FIG. 9 is a front view of the tree flowline flange landed in the alignment channel of the flowline alignment assembly;

FIG. 12 is a side view of the funnel assembly of the flowline positioning assembly having moved the storage flowline and the carrier assembly attached therewith to a position of partial alignment with respect to the Christmas tree flowline flange;

FIG. 13 is a side view of the funnel assembly of the flowline positioning assembly with the carrier assembly for the storage flowline having been moved into a locked position with the funnel assembly;

FIG. 14 is a side view in section of the funnel assembly as described in FIG. 13;

FIG. 15 is a side view of the flowline alignment assembly with the funnel assembly having been tilted or pivoted downwardly by hydraulic power to a position wherein the storage flowline flange is substantially in complete alignment with the Christmas tree flange;

FIG. 16 is a front view of the funnel assembly having landed the carrier assembly and storage flowline flange in substantially complete alignment as illustrated in FIG. 15;

FIG. 17 is sectional view taken along line 17—17 in FIG. 16 illustrating the secondary hydraulic terminal for the hydraulically operated connection apparatus mounted with the Christmas tree flowline flange;

FIG. 18 is a sectional view of the release mechanism for releasing the carrier assembly from the storage flowline flange;

FIG. 19 is a sectional view taken along line 19—19 of FIG. 18 illustrating the structure and connection of the storage flow line test flange or blank with the carrier assembly and storage flowline flange;

FIG. 19a is a sectional view taken along line -- 19a of FIG. 19 illustrating the retention of the horizon-19a tal latch dog by the storage flowline testing flange prior to a removal thereof;

FIG. 20 is a sectional view similar to FIG. 18 of the release mechanism having released the carrier from connection with the storage flowline flange;

FIG. 21 is a side view of the flowline positioning assembly in a slightly raised position for removing the storage flowline testing flange;

FIG. 22 is a side view similar to FIG. 21 of the flowline positioning assembly with the funnel assembly tilted upwardly;

FIG. 25 is a side view of the removal tool in position for removing the seal assembly attached to the Christmas tree flowline flange; and FIG. 26 is a side view of the flowline flanges having been moved apart to allow the removal tool to remove the seal assembly.

DESCRIPTION OF THE PREFERRED EMBODIMENT

Figure 10:
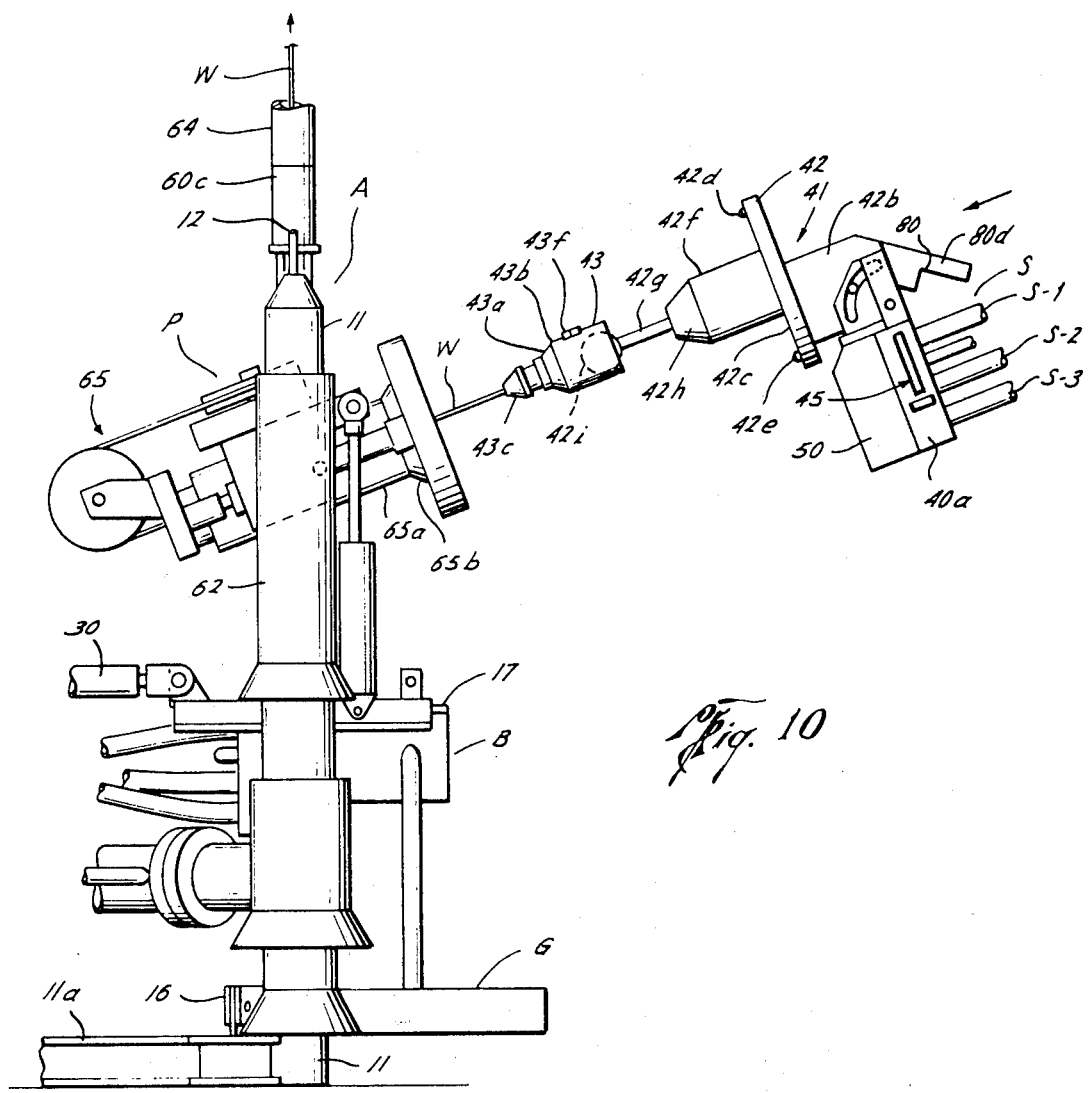
FIG. 10 is a partially schematic side view of the landed flowline positioning assembly prior to the pulling of the storage flowline probe into the funnel assembly.
Figure 11:
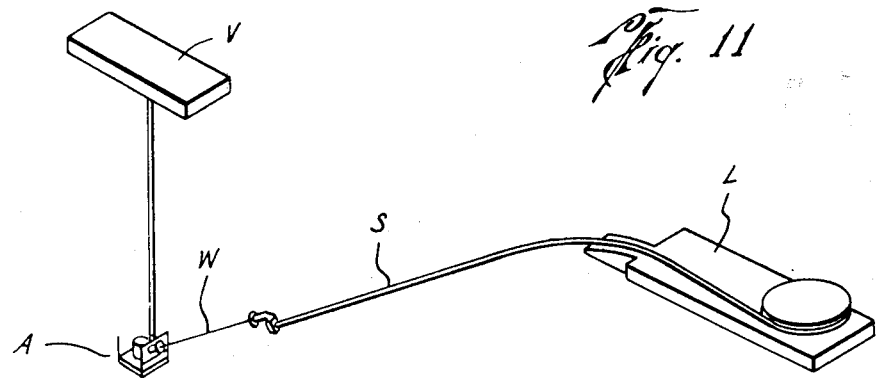
FIG. 11 is a schematic view of the relative positions of the surface vessel and the flowline lay barge with respect to the subsea oil well.
Figure 23:
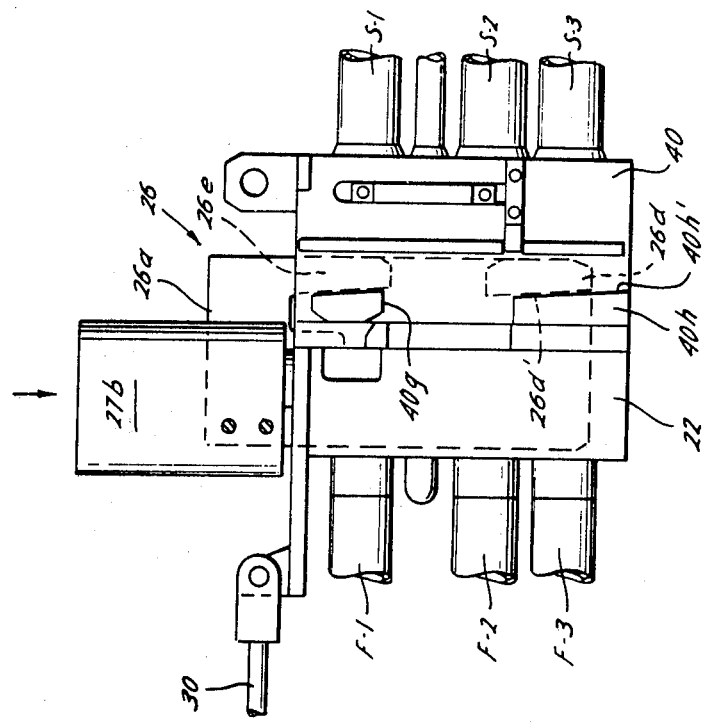
FIG. 23 is a side view of the connection means with the side connection plates in a raised position with the Christmas tree flowline flange and the storage flowline flange in position for connection.

Referring to the drawings, the letter A generally designates the apparatus of the preferred embodiment of this invention for making a fluid connection at the site of a subsea well between a Christmas tree flowline network F and a storage flowline S which extends from the side of the well upwardly to some type of storage facility on the surface of a body of water. The apparatus A basically comprises a guide structure G which is particularly illustrated in FIG. 2, a flowline alignment assembly B illustrated in various Figures, including FIGS. 5 and 10, a fluid flow control network or Christmas tree T illustrated in FIG. 1 in particular and a flowline positioning assembly P illustrated in various figures, including FIGS. 5 and 10. The apparatus A of this invention is for mounting on an oil well housing schematically designated by the letter H in FIG. 1, which has been drilled into formations underlying the floor of the ocean or other body of water. The apparatus A of this invention is generally used in cooperation with a surface vessel V and a flowline lay barge L (FIG. 11).

The first step in making the underwater connection between a storage flow line S and a Christmas tree flowline F is to lower downwardly from the surface vessel V the guide structure G. The guide structure G includes a main cylindrical housing portion 10 which is connected with four upwardly extending guide posts 11 through radially extending frame members 11a which are welded onto the main housing 10 and extend radially outwardly therefrom into welded connection with the guide posts 11. Side frame members 11b extend between adjacent pairs of the radially extending frame members 11a in order to cooperate with the radially extending frame members to provide a suitably strong frame to support the guide posts 11. In the embodiment of the invention illustrated in the drawings, the frame members 11a and 11b are I-beams. Each of the guide posts 11 are connected with a flexible guideline 12 which extends upwardly from the well to the operating vessel V on the surface of the body of water with the guide structure positioned on the well housing H. In this manner, the guidelines 12 can be used as a guide system for lowering tools and other equipment such as the inventive components described herein. downwardly from the operation vessel V onto the guide posts 11.

After the direction of approachment of the storage flowline S has been decided, the flowline alignment assembly B is lowered on the guidelines 12 onto the guide posts 11. The flowline alignment assembly or tool B includes a main plate member 14 which is welded to guide sleeves 15a and 15b which are adapted to fit over the guide posts 11 of the guide structure G. The guide sleeves 15a and 15b are known in the art and include enlarged conical lower sections such as 15a' which cooperate with upper tapered portions such as 12a of the guide posts 11 to center the guide sleeves such as 15a over the guide posts as the flowline alignment assembly is lowered along the guidelines 12. The main plate member 14 which is welded or otherwise connected to the two side guide sleeves 15a and 15b includes a horizontal platform portion 14a welded or otherwise connection to the main plate member, which is positioned in a substantially vertical plane when mounted with the guide posts 11.

The flowline alignment assembly B further includes a latch channel 14b which provides a U-shaped resess for receiving a latch from a suitable running tool which is utilized to actually lower the flowline alignment assembly B downwardly from the operating vessel V onto two of the guide posts 11. The flowline alignment assembly B is actually landed onto the guide structure G by the landing of the guide sleeves 15a and 15b onto the radial guide structure frame members 11a. The flowline alignment assembly B is latched to the radially extending guide structure frame members 11a by latch mechanisms 16 illustrated in FIGS. 3, 4 and 10. The latch mechanisms 16 include a latch portion 16a pivotally mounted to support studs 16b which are welded or otherwise attached to the main plate member 14. The latch portions 16a are adapted to pivot to a position under top portions 11c of the radial guide structure frame members 11a thereby securing the flowline alignment assembly B onto the guide structure G.

The flowline alignment assembly B further includes an alignment channel 17 which is adapted to provide the channel or track for receiving the Christmas tree flowline F and the storage flowline S in a position of substantially complete alignment and for making a sealed, fluid connection therebetween. The alignment channel 17 includes a side channel members 17a and 17b which are welded in a U-shaped recess 17c in the main frame member 14. The side channel member 17a has a substantially T-shaped slot 17d therein which is positioned opposite of another substantially T-shaped slot 17e in the side channel member 17b. Further, the side channel member 17a includes a substantially V-shaped slot 18a which is machined into a top landing surface 18b thereof. Similarly, the side channel member 17b has a substantially V-shaped slot 19a positioned across from the V-shaped slot 18a, the slot 19a being machined in the top landing surface 19b thereof. The side alignment channel member 17a is supported by pipe member 20a extending from the platform member 14a. In the embodiment of this invention illustrated and discussed herein, the flowline alignment assembly B is actually run or lowered along the guidelines 12 by means of the flowline positioning assembly. The mechanism for attaching the flowline alignment assembly B to the flowline positioning assembly or running tool will be described hereinafter.

After the flowline alignment assembly B has been lowered along the guidelines 12 and landed onto the guide structure G, a fluid flow network or Christmas tree T is lowered along the guidelines 12 and landed onto the guide structure G and the flowline alignment assembly B. The fluid flow network, hereinafter referred to as a "Christmas tree" is basically well known in the art as being a fluid flow control device for controlling fluid flow outwardly of an oil well. The Christmas tree T utilized in this invention includes a main housing portion 21 which is adapted for mounting over the central housing portion 10 of the guide structure G for controlling fluid flow outwardly of the oil well. The Christmas tree T includes three Christmas tree flowlines F-1, F-2 and F-3 which terminates in a tree flowline flange 22. The tree flowline flange 22 is actually an assembly which includes a flange member or box 22d which is adapted to receive the end portions of each of the flowlines F-1, F-2 and F-3. The flowline flange has connected thereto in a manner to be described hereinafter a removable seal plate assembly 23 which is provided for making the fluid, sealed connection between the tree flowline flange 22 and the storage flowline S. The tree flowlines F-1, F-2 and F-3 are also joined in a hub portion 24 which is slidably mounted within a flowline guide sleeve 25 attached to the tree housing 21. In this manner, the portions of the flowlines F-1, F-2 and F-3 between the hub portion 24 and the tree flowline flange 22 as well as the flange itself, are mounted for moving in a substantially horizontal direction, a direction substantially perpendicular to the main, vertical axis for the main tree housing portion 21. As previously known, the curved flowlines F-1, F-2 and F-3 flex in order to allow movement of the substantially horizontally positioned end portions thereof supported by the tree sub portion 24 and the tree flowline flange 22.

The Christmas tree T is lowered along the guidelines 12 by any suitable running tool which is connected into a sub located at the upper portion 21a of the Christmas tree T. When the Christmas tree T has been landed onto the guide structure G and the flowline alignment assembly B, the tree flowline flange 22 is positioned in and supported by the alighment channel 17 between the side channel members 17a and 17b. In order to center the tree flowline flange 22 between the side channel members 17a and 17b, the side channel members 17a and 17b are each provided with beveled top edges 17f and 17g, respectively, in order to cooperate with the tree flowline flange 22 to properly align the flange 22 between the side channel members 17a and 17b. In order to further accomplish this alignment or centering of the tree flowline flange 22 in the alignment channel 17, beveled portions 22a and 22b are provided on a flowline connection means 26 which will be described in greater detail hereinafter. Of course, the Christmas tree T includes suitable frame members such as illustrated at 27a, 27b, 27c and 27d which extend outwardly from the main tree housing portion 21 and terminate in guide sleeves 28. The guide sleeves 28 allow the Christmas tree T to be lowered on the guide lines 12 and serve to mount the tree T over the guide posts 12 in a known manner.

Figure 7:
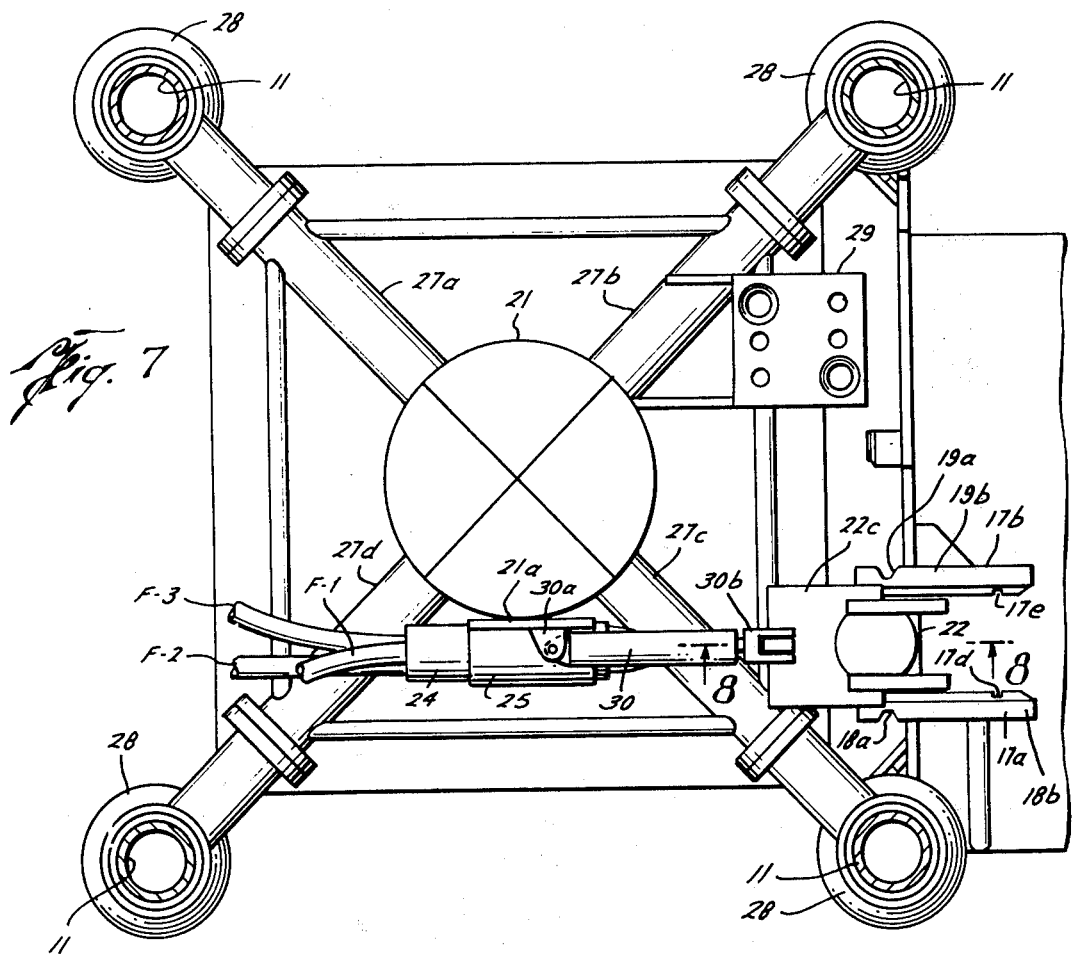
FIG. 7 is a top view of the Christmas tree illustrating the landed position of the Christmas tree flowline flange and the hydraulic means for positioning same.

The Christmas tree T is further provided with a secondary hydraulic terminal which is designated by the number 29 and illustrated in FIGS. 7 and 17 for providing fluid connection between the tree and the surface after the conventional hydraulic manifold mounted with the main housing 21 has been capped.

A hydraulic power assembly 30 extends between the hub guide sleeve 25 and the flowline flange 22 in order to provide hydraulic force to move the tree flowline flange 22 in a substantially horizontal direction into and out of the channel 17. The hydraulic power assembly 30 is pivotally mounted onto a mounting plate 21a attached to the main tree housing 21 and further onto a tree flange connector plate 22c which is welded or otherwise attached onto the top of the tree flowline flange 22. The hydraulic cylinder assembly 30 is pivotally connected by any suitable means such as the lug and pin connections illustrated at 30a to the mounting plate 21a and at 20b to the tree flange connector plate 22c. The pivotal connection at 30a to the tree mounting plate 21a allows the tree flowline flange 22 to be pivoted with respect to the hydraulic assembly 30 in a horizontal plane as illustrated in the drawings. The pivotal connection at 30b between the hydraulic power assembly 30 and the tree flange connector plate 22c alllows the tree flowline flange 22 to be pivoted in a vertical plane. In this manner, the hydraulic power assembly 30 is operable to move the tree flowline flange 22 inwardly and outwardly of the channel in spite of horizontal or vertical variations in the position of the tree flowline Referring to FIG. 11, the flowline positioning assembly P is lowered along the guidelines 12 and landed on the flowline alignment assembly B in a manner to be described hereinafter in detail. When the tool P is landed at the well, the wireline W extends from the vessel V to the tool P and from the tool P to the lay barge L. The lay barge L is then used to lay the flowline S downwardly to a position adjacent the pulling tool P at the well.

The storage flowline S actually includes three flowlines S-1, S-2 and S-3 which terminate in a storage flowline flange 40. The storage flowline flange 40 is actually an assembly which includes a flange member 40a which receives and supports the end portions of the three storage flowlines S-1, S-2 and S-3. A carrier assembly generally designated by the number 41 is releasably mounted onto the flange member 40a for cooperating with the flowline pulling tool P to first partially position and then completely position the flange member 40a in the alignment channel 17 of the flowline alignment assembly B. The carrier assembly 41 includes a landing flange assembly 42 pivotally mounted onto the storage flowline flange member 40a and a probe unit 43 pivotally mounted onto the landing flange assembly 42. The landing flange assembly 42 includes side mounting plates 42a and 42b which are pivotally mounted by pins 51e and 51f (to be described hereinafter) onto upwardly extending lugs 40b and 40c which extend upwardly from the top of the storage flowline flange member 40a. The actual pivotal connection between the landing flange assembly 42 and the storage flowline flange 40 is releasable by a releasable, pivotal connection means generally designated in FIG. 18 by the number 44. The side mounting plates 42a and 42b are welded or otherwise connected to a circular flange member 42c having extending therefrom laterally alignment pins 42d and 42e. A cylindrical member 42f is welded or otherwise attached at the center of the circular flange 42c (also referred to as a landing flange). A connecting pin 42g extends outwardly from the tapered end portion 42h of the cylindrical landing member and terminates in an integrally formed nut 42i. Thus the entire landing flange assembly 42 is mounted for pivotal movement with respect to the storage flowline flange 40.

The nut portion 42i has a slot 42j therein, the slot being a straight U-shaped groove. The probe unit 43 includes a nose portion 43a comprised of a hollow, cylindrical portion 43b which tapers downwardly to a nose point 43c. The hollow cylindrical nose portion 43b includes a spherically shaped recessed portion 43d adapted to be mounted over the nut 42i. A pin 43e is mounted in the spherically shaped recess and extends inwardly into the slot 42j in the nut 42i. The nose portion is attached to the wireline W by a leaded spelter socket 43e. In this manner the nose 43a is mounted for pivotal movement in at least two planes with respect to the connector pin 42g. However, the pin 43e in the nose portion 43a prevents rotation of the nose portion 43a with respect to the nut 42i. For example, if the connector pin 42g and the remainder of the landing flange assembly 42 is positioned in a horizontal plane, the nose portion 43a will be pivotal in a horizontal plane and a vertical plane but will be prevented by the pin 43e from twisting or rotational movement in a clockwise or counterclockwise direction.

The storage flowline flange member 40 further includes a substantially T-shaped detent means 45 for locking the storage flowline flange in the substantially T-shaped slots 17d and 17e in the alignment side channel members 17a and 17b, respectively. Referring to FIG. 19, the substantially T-shaped detent means 45 includes a vertical detent portion 45a and a horizontal detent portion 45b which are resiliently mounted in the sides of the flowline flange member 40a and are urged outwardly thereof by any suitable resilient means such as springs 45c positioned between the flowline flange member 40a and the detent members such as 45b.

After the flowline flange member 40a is landed in the alignment channel 17 in a position of substantially complete alignment with the tree flange 22, the carrier assembly 41 is released from connection with the tree flowline flange member 40a. Prior to such release, the flowlines S-1, S-2 and S-3 are independently tested by testing flange assembly 50, which is subsequently removed with the carrier assembly 41.

The testing flange assembly 50 is releasably mounted onto the front storage flowline face 40d and is also attached to the carrier assembly 41. The testing flange assembly 50 is provided for independent testing of the flowlines S-1, S-2 and S-3 after the flowline flange 40 has been landed in the alignment channel 17 on the flowline alignment assembly B. This independent testing of the flowlines S-1, S-2 and S-3 is accomplished prior to the making of a sealed, fluid connection between the tree flowline flange 22 and the storage flowline flange 40.

The testing flange assembly 50 includes a blank or plate 50a which is adapted to be placed adjacent to the front storage flowline face 40d. A top plate 50b and two side plates 50c are mounted onto the top and sides 40e, respectively, of the flowline flange such that the flowline flange can be placed over the top and sides of the storage flowline flange member. The side plates 50c for the testing flange assembly include a longitudinal groove 50d which is adapted to receive a corresponding longitudinal ridge 46 on each side of the storage flowline flange. Further, the side plates 50c terminate in retainer ridges or ears 50e which extend inwardly against the horizontal dogs 45b of the substantially T-shaped detent members 45 mounted on the flowline flange member 40a. The ears 50e on the testing flange assembly side plates 50c serve to hold the horizontal detent members 45b inwardly out of the corresponding horizontal groove portions on the T-shaped grooves such as 17d in the alignment side channel member 17a. This allows the flowline flange 40 to be removed by a vertical lifting force prior to removal of the testing flange assembly 50. A center mounting plate 50f is welded or otherwise attached onto the testing flange assembly top plate 50b for releasably attaching the testing flange assembly 50 with the storage flowline flange member 40a and for attaching the testing flange assembly 50 to the carrier assembly 41.

The releasable pivotal connection means 44 provides a releasable, pivotal connection between the landing flange assembly 42 and the flowline flange member 40a. the releasable pivotal connection means 44 further releases the testing flange assembly 50 from the testing position as illustrated in FIG. 19. A movable releasable pin assembly generally designated by the number 51 is mounted in the landing flange assembly side plates 42a and 42b and extends through the upwardly extending storage flowline flange lugs 40b and 40c in order to provide a releasable connection between the landing flange assembly 42 and the flowline flange member 40a. The releasable connection means includes the following elements which are mounted for movement as a releasable pin unit. An actuator pin 51a is slidably mounted in the carrier plate 42b. The actuator 51a is operated by actuation of the hydraulic power assembly 52 which includes a rod portion 52a in position to extend into engagement and actually move or displace the actuator pin 51a. The actuator pin 51a is attached to a first connector plate 51b which is positioned between the testing flange assembly central mounting plate 50f and the landing flange assembly side mounting plate 42b. The connector plate 51b is attached to a retaining pin 51c which extends through the arcuate slot 50g in the testing flange assembly central mounting plate 50f and further extends through landing flange assembly side mounting plate 42a. A second connector plate 51d is attached to the retainer pin 51c outside the landing flange assembly side mounting plate 42a. The connector plate is also attached to a releasing pin 51e which in FIG. 18 extends into an opening in the upstanding flange lug portion 40b. The first connector plate 51b of the releasable pin unit 51 is attached to a release pin 51f which extends through an opening in the upstanding lug portion 40c on the storage flowline flange member 40a. Further, a retainer pin and sleeve combination 51g is attached to the first connector plate 51b and extends through an opening 51h in the testing flange assembly center mounting plate 51f.

The releasable pin or connection unit 51 releasably attaches the landing flange assembly 42 and the testing flange assembly 50 with the flowline storage flange 40. The connected position is illustrated in FIG. 18. After the flowline flange 40a has been landed in a position of substantially complete alignment in the alignment channel 17a with the tree flowline flange 22, the hydraulic cylinder assembly 42a is actuated from a remote point to drive the rod 52a into engagement with the actuator pin 51a thereby moving the entire releasable pin unit to a release position wherein the release pins 51e and 51f have been moved out of the upstanding flowline flange lugs 40b and 40c, respectively. Movement of the release pins 51e and 51f out of the upstanding lug portions 40b and 40c free the entire carrier assembly 41, including the landing flange assembly and the testing flange assembly, for movement off of the landed flowline flange 40a, which will be landed in a manner to be described hereinafter.

Prior to removal of the testing flange assembly 50, the flowline flanges S-1, S-2 and S-3 are tested individually to determine if there are any leaks or other problems in the flowlines which have been laid from the lay barge L downwardly to the well. It is understood that some of the prior testing procedures utilized did not provide for testing of the laid flowlines S-1, S-2 and S-3 until after connection with the Christmas tree T. However, utilizing the testing flange assembly of this invention, the flowlines S-1, S-2 and S-3 can be tested prior to connection, thereby isolating any problem with the flowlines before connection with the remainder of the system.

Referring again to FIG. 19, the testing flange assembly 50 includes a central passageway 53 which extends longitudinally of the flowline blank member 50a in order to provide fluid communication between each of the flowlines S-1, S-2 and S-3. Suitable O-rings such as 50h prevent the entry of sea water between the blank member 50a and the flange member 40a. An impression making pin 54 having a cone-shaped point 54a is mounted into the back face 53a of the passageway or bore 53 in alignment with the storage flowline S-1. The impression making point 54a is adapted to receive a block of soft material such as lead mounted onto a suitable pig or other pressure differential tool which is pumped through the flowline S-1 from the surface downwardly to the testing flange assembly 50. If the soft material block is pumped all the way through the flowline S-1 from the surface downwardly to the flowline flange, it will engage the impression making point 54a thereby causing a cone-shaped depression in the block. Reverse circulation through either or both of the other flowlines S-2 and S-3 will move the soft material block with the cone-shaped depression therein outwardly of the flowline S-1 so that the operators can determine that the block actually progressed all the way through the entire flowline S-1, thereby ensuring that the flowline S-1 is not obstructed at any point.

Another impression making point 55 having a chisel-shaped point 55a is mounted on the back face 53a of the passageway 53 in order to receive and provide a chisel-shaped impression in a block of soft material pumped through the flowline S-2. Impression making pin 56 is mounted on the back plate 53a of the the testing flange assembly passageway 53 in alignment with the flowline S-3 in order to receive and make a ring-shaped depression in a block of soft material by means of the ring-shaped point 56a. Thus each of the flowlines S-1, S-2 and S-3 can be independently tested from the surface in order to ensure that the flowlines do not have any obstructions therein. After the testing operation, the testing flange assembly 50 is removed along with the entire carrier assemby 41 from attachment with the flowline flange 40 in order to free the flowline flange 40 for connection to the tree flowline flange 22.

The details of the structure of the storage flowline S have now been described. The storage flowline flange 40 has been described as being releasably connected to a carrier means which is adapted to cooperate with the flowline pulling tool P to actually land the storage flowline flange 40 in a position of substantially complete alignment in the alignment channel 17 with the tree flowline flange 22. In order to accomplish this manipulation of the storage flowline S into a position of final alignment for connection with the tree flowline flange 22, a flowline pulling tool P of particular construction and utilization has been invented.

The flowline positioning or pulling tool P includes a main frame section 60 which terminates in guide sleeves 61 and 62 which are adapted to be mounted over the guide structure guide posts 11. The main frame section 60 includes a central plate member 60a which is connected to a horizontally extending pipe member 60b which is welded onto the guide sleeves 61 and 62. A connector sub 60c is welded or otherwise attached at the top of the frame plate 60a for connection with a suitable running tool such as a drillpipe running tool represented by the number 64. The frame plate member 60a has a recess 60d therein for mounting a funnel assembly generally designated by the number 65 for manipulating the carrier assembly 41 attached with the flowline storage flange 40. Horizontally positioned support plates 66a and 66b are welded or otherwise mounted onto the bottom of the frame plate 60a on either side of the recessed area 60d in order to provide support for the pivotal mounting of the funnel assembly 65. The frame plate 60a has mounted therewith on either side the recess 60d landing corner plates 67a and 67b which are positioned for insertion into the landing slots 18a and 19a on the alignment channel members 17a and 17b. In this manner, the entire flowline pulling tool P is positioned and aligned with respect to the flowline alignment assembly B as it is lowered onto the flowline alignment assembly B.

A hydraulic assembly 68 is mounted by any suitable means onto the frame plate 60a adjacent to a running latch member 69, which is also pivotally mounted onto the frame member 60a. The flowline pulling tool P may be used as a running tool for running downwardly the flowline alignment assembly B. When used as running tool, the latch member 69 is latched into the U-shaped recess in the channel 14b of the flowline alignment assembly B. Drillpipe represented as 64 is then utilized to run downwardly on the guidelines 12 the flowline pulling tool having attached therewith the flowline alignment assembly B. When the flowline alignment assembly B is positioned onto the flowline guide structure G as previously described, the hydraulic cylinder assembly 68 is actuated to pivot the running latch 69 out of the groove in channel 14b so that the pulling tool P can be returned to the surface for installation of the Christmas tree T.

The funnel assembly 65 is provided for pulling inwardly the carrier assembly 41 and storate flowline flange 40 to a position of partial alignment with respect to the tree flowline flange 20a and then finally to a position of complete alignment therewith. The funnel assembly 65 cooperates with a remotely operable hydraulic power means 70 to move the storage flowline flange 40 to the position of final alignment with tree flange 20.

Referring to FIGS. 3, 5, 10, 12–16 and 21–22, the funnel assembly 65 includes the following elements. The funnel assembly 65 includes a funnel sleeve 65a which is connected by suitable means with an enlarged funnel flange portion 65b. The enlarged, funnel flange portion 65b includes a tapered or frustro-conical receiving surface 65c adapted to receive the landing flange 42c. Alignment holes 65d and 65e are provided in the tapered, annular surface 65c for receiving alignment pins 42d and 42e laterally extending from the landing flange 42c. The funnel portion 65a is mounted onto the frame member 60a from pivotal movement between an upwardly tilted position such as illustrated in FIG. 5 and a downwardly tilted position such as illustrated in FIGS. 15, 16 and 21. The pivotal mounting of the funnel assembly including the funnel assembly 65 is accomplished by the attachment of vertical plates such as 71a onto the frame plate 60a on either side of the recess 60d. The vertical plates have openings therein adapted to receive pins which extend into pivotal contact with the funnel sleeve 65a. The pins positioned on either side of the funnel sleeve 65a are designated by the number 72. The vertical support plates 71 extend downwardly into contact and are supported by the horizontal support plates 66a and 66b which have been previously described as being attached at the bottom of the frame member 60a on either side of the recess 60d. A funnel assembly support plate 73 is welded or otherwise mounted onto the top of the funnel sleeve 65a and includes side plates 73a which pivot with the pivotally mounted funnel sleeve 65a. Hydraulic power cylinders 74 are mounted on either side of the recess 60d in the frame member 60a and extend into pivotal connection with the support plate 73 in order to provide remotely operable hydraulic power to move the entire funnel assembly 65 between the upwardly tilted position and the downwardly tilted position. The hydraulic power assemblies 74 are pivotally mounted by pin and lug connections such as 74a onto the support plates 66b and 66a. Suitable pin and lug connections 74b are also made between the hydraulic power assemblies 74 and the side support plates 73a mounted with the funnel sleeve 65a.

The locking means 75 includes a locking tool 75a which is mounted within the hollow funnel section 65a for slidable movement with respect to the funnel section 65a. The sleeve 75a includes a tapered end portion 75b adapted to seat a correspondingly tapered portion 43a of the probe unit 43. Latch means 75c are mounted within the hollow bore 75d of the locking sleeve or tool 75a for latching the tapered nose 43c into the bore 75d such that the entire probe unit 43 and landing flange assembly connected therewith are movable with movement of the locking tool 75a. The locking tool 75a is hydraulically powered by means of hydraulic cylinder assemblies 76 mounted on either side of the funnel section 65a. The hydraulic cylinder assemblies 76 are suitably mounted to the funnel section 65a onto suitable connecting studs which are connected to the funnel section 65a. The hydraulic power assemblies are also attached to a rear tool plate 75e which is mounted at the rear of the locking tool or sleeve 75a. The providing of hydraulic fluid under pressure to the power assemblies 76 provide for slidable movement of the locking tool 75a out of the funnel section 65a thereby pulling the landing flange assembly 42 into the funnel portion 65a and 65b.

The wireline W is passed through the funnel assembly including the funnel section 65a and through the locking tube 75a and extends upwardly to the operating vessel at the surface. A sheave network 77 is provided for redirecting the path of the wireline from its direction of extension through the funnel assembly 65 into a direction extending upwardly to the surface of the water. The sheave network 77 includes a first sheave 77a mounted onto the rear tube plate 75e. This first sheave 77a is thus mounted for movement with the locking tool 75a. A second sheave 77b is mounted onto a support plate 77c attached with the funnel section 65a. A third sheave 77d is actually mounted onto the pulling tool frame plate 60a in order to finally direct the wireline W upwardly toward the surface vessel V. Of course, each of the sheaves are mounted for rotation in a well known manner such that the wireline can be manipulated from the surface in order to pull the carrier assembly 41 and storage flowline flange inwardly into a position of partial alignment with respect to the tree flowline flange 22.

The funnel section 65a includes therein two circular or helical surfaces 49, one of which is illustrated in FIG. 14, which begin at the front end 65a' at the bottom of the funnel section and curve in a helical path and terminate at the rear end 65c of the funnel section 65a at the top thereof. The double helical surfaces 49 are adapted to receive a vertical aligning pin 43f which extends outwardly from the main nose section 43b. In this manner, the nose 43a for the probe unit 43 is cammed or gradually forced to a vertical position as the locking tool 75a pulls the nose 43a of the probe unit 43 further inwardly such that the entire carrier assembly is locked for movement with the funnel assembly 65 and the flowline flange 40 is in a vertical position for seating between the alignment channel members 17a and 17b.

Referring in particular to FIGS. 10, 12–16 and 21 and 22, the flowline pulling tool P operates to move the carrier assembly 41 and storage flowline flange 40 into a position of final alignment between the alignment channel members 17a and 17b in the following manner. The wireline W is connected between the surface vessel V, the funnel assembly 65 and the tapered nose portion 43c prior to the storage flowline S being laid or lowered into the water from the lay barge L. The storage flowline S is laid or extended outwardly from the lay barge L in a known manner and the flowline S is finally positioned such that the end thereof which includes the carrier assembly 41 and the storage flowline flange 40 are positioned substantially adjacent to the flowline alignment assembly B. At this point, the Christmas tree T and the flowline alignment assembly P have already been lowered along the guidelines 12 and landed onto the guide structure and the flowline alignment assembly B. The wireline W extends from the sheave 77d into connection with any suitable wireline control means which is capable of exerting great pulling strength on the wireline after the flowline pulling tool P is lowered and landed.

The flowline pulling tool P is lowered along the guidelines 12 by a drillpipe running tool 64 or other suitable means. If a drillpipe running tool is utilized, the wireline W can be positioned within the drillpipe. The flowline pulling tool is aligned with and landed onto the flowline alignment assembly in the following manner. The side, guide sleeves 61 and 62 are mounted over the guide posts 11 which have received the guide sleeves of both the flowline alignment assembly and the Christmas tree. The landing corners 67a and 67b are landed in the slots 18a and 19a in the alignment channel members 17a and 17b, respectively, thereby centering properly the pulling tool P onto the flowline alignment assembly B. After the pulling tool P is landed, the wireline pulling means at the surface is operated to pull on the wireline until a dart or other connection point on the wireline is attached at the surface pulling apparatus such that the initial positioning process can begin.

The wireline pulling apparatus at the surface is actuated to exert upward pulling force on the wireline through the drillpipe running tool 64 thereby causing the probe unit 43, the landing flange assembly 42 and the storage flowline flange 40a to be moved inwardly toward the upwardly tilted funnel sections 65a and 65b. The wireline is pulled from the surface until the nose 43a of the probe unit 43 is pulled into the funnel section 65a and further into the locking sleeve 75a and is latched by the latching element 75c. At this point, the entire carrier assembly 41 with the storage flowline flange 40 has been moved to a position of partial alignment with respect to the tree flowline flange 22.

When the pulling tool P was landed on the flowline alignment B, a secondary hydraulic terminal 78 mounted on the pulling tool frame member 60a was inserted into the secondary hydraulic terminal 29 on the Christmas tree T. Hydraulic connection was made between the secondary hydraulic terminal connection 78 on the pulling tool P by the use of alignment pins such as 78a, illustrated in FIG. 17, which are inserted into alignment bores 29a on the tree terminal connection. The insertion of the alignment pins 78a into the alignment bores 29a serve to make hydraulic connection between the male hydraulic terminal member 78b and female hydraulic terminal member 28b on the Christmas tree T. The secondary hydraulic terminal 78a on the pulling tool is connected by suitable fluid lines with the surface. Therefore, hydraulic fluid under pressure can be applied through the secondary, male hydraulic terminal on the pulling tool into the female, hydraulic terminal on the Christmas tree and to the hydraulic mechanisms mounted with the Christmas tree such as the hydraulic power assembly 30 for manipulating the tree flange 22. This eliminates the necessity of having to re-enter the conventional hydraulic terminal mounted at the upper portion 21a of the Christmas tree main housing 21. Mounted with the secondary hydraulic terminal 78 are a series of hydraulic fluid connections extending from the surface downwardly into hydraulic fluid connection with the various hyydraulic power assemblies mounted on the pulling tool P itself, such as the funnel hydraulic pivoting assembly 74 and the locking tool hydraulic assemblies 76.

At this point, the carrier assembly 41 and the storage flowline flange 40 are partially aligned with respect to the Christmas tree flange 22. The hydraulic power assemblies 76 are now actuated by the application of hydraulic fluid from the surface vessel V to move the locking tool 75a outwardly of the funnel section 65a thereby pulling the cylindrical landing portion 42f into the funnel section 65a. The hydraulic cylinder assemblies 76 move the locking tool 75a until the landing flange 42c is locked against the annularly tapered funnel end portion 65b. As the landing flange assembly is moved inwardly, the stud or alignment pin 43f on the nose 43a engages one of the two helical surfaces 49 thereby gradually rotating the nose and the remainder of the carrier assembly 41 to a vertical position.

The engagement of the alignment pin 43f into one of the helical surfaces 49 causes the probe unit 43 and the landing flange assembly and the storage flowline flange to be moved to a vertical position if not already in a vertical position, due to the restricted pivotal connection between the nose 42a and the connector nut 42i of the landing flange assembly 42. When the alignment pin 43 has reached the top end portion 65c of the helical surface 49, the landing flange 42c is in a position such that the alignment pins 42d and 42e are inserted into the alignment openings 65d and 65e in the funnel flange portion 65b. Thus the nose 43 and the landing flange 42c are moved entirely into a locked position with respect to the funnel sections 65a and 65b so that the landing flange assembly is locked for movement with the funnel sections 65a and 65b.

With the landing flange 42c locked against the funnel end section 65b, the hydraulic cylinders 74 are remotely actuated to tilt the funnel sections 65a and 65b downwardly to the downwardly tilted positions illustrated in FIGS. 15 and 16. Referring to FIG. 16, the side mounting plates 42a and 42b for the landing flange assembly 42 include landing plates 80c and 80d (which are welded or otherwise attached to said plates 42a and 42b) which are adapted to land onto the top, front corners 80a and 80b of the alignment channel members 17a and 17b, respectively. The landing corners 80a and 80b provide a right angle landing corner adapted to receive notch portions 80 on each of the plates 80c and 80d. Each of the notch portions 80 include two landing shoulders or surfaces which join at a right angle. This landing of the right angle notch portions 80 of the side mounting plates 42a and 42b onto the landing corners 80a and 80b serve to position the flange member 40a in the alignment channel 17 between the alignment channel members 17a and 17b. The flowline S including the flowlines S-1, S-2 and S-3 are then manipulated to a horizontal position such as illustrated in FIG. 15 such that the flange member 40a is moved to a substantially vertical position within the alignment channel and the vertical dogs 45a move into vertical portions of the T-shaped alignment channel member slots 17c and 17d. If desired, the flowlines S-1, S-2 and S-3 can be moved to a horizontal position prior to the pivoting of the funnel sections 65a and 65b downwardly to the downwardly tilted position. In this event, the actual pivoting of the funnel assembly 65 will land the flowline flange in a substantially vertical position and the vertical latch portions 45a will move into the T-shaped slots 17c and 17d upon the landing of the landing notches 80 against the corner portions 17f and 17g. When the detent portions 45a are pushed outwardly by the previously resilient means into the vertical portions of the T-shaped slots 17c and 17d, the flowline flange member 40 is in a position of substantially complete alignment with the tree flowline flange 22. The movement of the flowline flange 40 from the position of partial alignment to the position of complete alignment has been accomplished by remotely operable hydraulic mechanisms as opposed to the utilization of a wireline only. One of the many advantages of the utilization of the funnel assembly 65a with its hydraulically actuated power cylinders such as 74 is that the use of the wireline to make this final positioning motion is eliminated. Thus, it is not necessary to maintain any kind of line under tension between the surface vessel V and the flowline pulling tool P during this final alignment operation. Rather, power means actuated from the surface but located entirely on the pulling tool actually move the carrier assembly 41 into the final locked position and into the final landed position on the alignment channels 17a and 17b. Referring to FIG. 20, the storage flowline flange 20 has outwardly extending lateral lugs 81a and 81b which are adapted to land onto the landing surfaces 18a and 19a of the alignment channels. These laterally extending lugs 81a and 81b serve to cooperate with the notches 80 to finally vertically position the flowline flange 40a with respect to the tree flange 22.

The independent testing of the flowlines S-1, S-2 and S-3 utilizing the flowline testing assembly 50 is at this point actually made. After it has been determined that the flowlines S-1, S-2 and S-3 are free of obstructions or other problems, the flowline testing assembly 50 can be removed in order to prepare the storage flowline flange 40 for connection to the tree flowline flange 22. First, the hydraulic cylinder assembly 52 is actuated to move the releasable pivotal connection means from the connected position of FIG. 18 to the released position of FIG. 20 thereby releasing the connection between the landing flange assembly 42 and the flowline flange 40a. Referring to FIG. 21, the entire flowline pulling tool P is then raised upwardly along the guide posts 11 thereby lifting the testing flange assembly 50 off of the storage flowline flange member 40a. The longitudinal grooves 50d in the side plates 50c of the testing flange assembly 50 ride over the flange member ridges 46 as the testing flange assembly is lifted outwardly. The lifting of the testing flange assembly 50 off of the storage flowline flange 40a releases the horizontal detent 45b into the horizontal portions of the alignment channel T-shaped slots 17d and 17e. As previously described, the releasable pivotal connection means 44 does not release the testing flange assembly 50 from its connection with the landing flange assembly 42, this remaining connection is of course necessary to actually pick up the testing flange assembly. For purposes of explanation, the actual remaining connection between the landing flange assembly 42 and the testing flange assembly 50 is caused by the retention of pins 51c and 51g in the central mounting plate 50f of the testing flange assembly 50.

Referring to FIG. 22, after the testing flange assembly 50 has been lifted completely off of the storage flowline flange 40, the hydraulic power assemblies 74 are actuated to tilt the funnel assembly 65 to its upward position again. The tilting of the entire funnel assembly to the upward position moves the testing flange assembly out of the way so that the flowline pulling tool P can again be lowered downwardly and landed on the flowline alignment assembly B. At this point the tree flowline flange 22 and the storage flowline flange 40 are substantially completely aligned between the alignment channel members 17a and 17b and are ready for connection.

The removable seal plate assembly 23 is removably, sealably mounted onto the front face 22f of the tree flowline flange member 22d. The removable seal plate assembly 23 includes a seal plate 23a having seal connector rings 23b, 23c, 23d and 23e positioned in openings in the seal plate. The connector ring 23b is mounted in an opening 23f in the seal plate and is sealed therein by O-ring 23g. The connector ring 23b includes annular ridge portions 23h and 23i which extend outwardly from both sides of the seal plate to engage corresponding grooves concentrically positioned about the ends of the flowlines in the flowline flanges 22 and 40. In this manner, a sealed connection can be made between the flowlines such as the flowline F-1 in the tree flowline flange 22 and the flowline S-1 in the storage flowline flange 40. The seal plate 23 is removable for replacement or repair in a manner to be described hereinafter.

The sealed, fluid connection between the tree flowline flange 22 and the storage flowline flange 40 is made by the flowline connection means 26 illustrated in FIGS. 8, 9 and 23-26. The connection means 26 includes two side plates 26a and 26b which are attached by bolts 26c to a power piston assembly 27. The power piston assembly 27 includes a stationary piston 27a which is mounted onto the tree flange member 22d and extends upwardly therefrom. A cylinder 27b is mounted over the stationary piston 27a in a sealed relationship therewith by seal rings such as 27c thereby providing a sealed chamber 27d adapted to receive hydraulic fluid under pressure. Entry of hydraulic fluid into the chamber 27d in the manner illustrated in FIG. 8 causes the hydraulic sleeve 27b to move upwardly to the release position illustrated therein. In the release position, the attached slide plates 26a and 26b are moved to the upper, release position shown in FIGS. 8, 9, 25 and 26. Entry of hydraulic fluid below the stationary piston 27 in the chamber 27d moves the movable cylinder downwardly to the connect position illustrated in FIGS. 23 and 24. Each of the side plates 26a and 26b include spaced inwardly extending lug portions or detents 26d and 26e having an entry recess 26f therebetween.

The storage flowline flange member 40a includes outwardly extending lug portions 40g and 40h which extend outwardly from the flowline flange member sides 40e. An entry recess 40i is thus formed between the upper lug 40g and the lower lug 40h.

With the side plates 26a and 26b in the upper release position illustrated in FIG. 8, the hydraulic power assembly 30 can be actuated through the secondary terminal connection illustrated in FIG. 17 to move the tree flowline flange 22 and the seal plate assembly 23 attached thereon into engagement with the storage flowline flange 40, which is completely aligned therewith. A sealed, fluid connection is made between the seal plate assembly 23 and the storage flowline flange member 40a by the insertion of the connection ring ridges such as 23i into corresponding grooves surrounding the flowlines such as S-1. Alignment pins 22i and 22j are positioned in alignment bores 40j and 40k. The alignment pins 22i and 22j can be tapered to ensure entry thereof into the bores, which may also be tapered.

Figure 24:
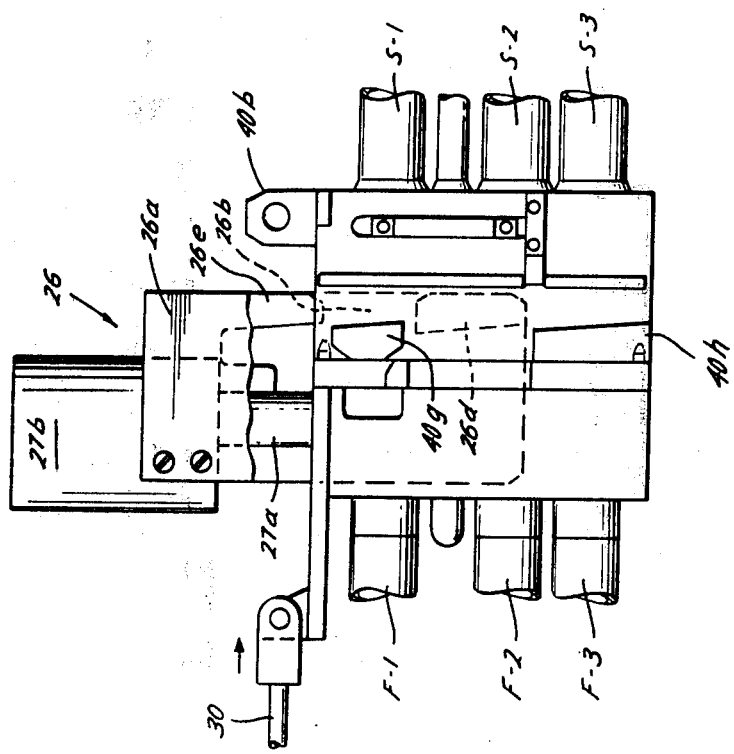
FIG. 24 is a side view similar to FIG. 23 with the connection means having made a sealed, fluid connection between the flowline flanges.

The side plates 26a and 26b in the upper, released posiiton are aligned with the storage flowline flange member 40 such that the upper outwardly extending lugs 40g pass through the side plate recesses 26f when the seal plate 23 actually engages the front face 40d of the storage flowline flange member 40a, the side plate lugs 26d and 26e have passed over the storage flowline flange lugs 40h and 40i and are on the other side thereof. This position is illustrated in FIG. 24. Hydraulic fluid is then passed into the chamber 27 below the stationary piston 27c thereby moving the cylinder 27b downwardly thus causing the side plates to move downwardly to the connected position of FIG. 24. In the connected position, the side plate lugs 26d and 26e which extend inwardly engage the storage flowline flange lugs 40g and 40h and lock the tree flowline flange 22, the tree plate assembly 23 and the storage flowline flange 40 in fluid, sealed connection. It should be noted that the side plate lugs 26d and 26e of the connector means include inwardly camming surfaces such as 26d' which engage complimentary cammed surfaces such as 40h' on the sides of the flange member 40a to cause the tree flowline flange 22 to move further into engagement with the seal plate assembly and the storage flowline flange 40 as the side plates are moved downwardly to the connected position.

Figure 1:
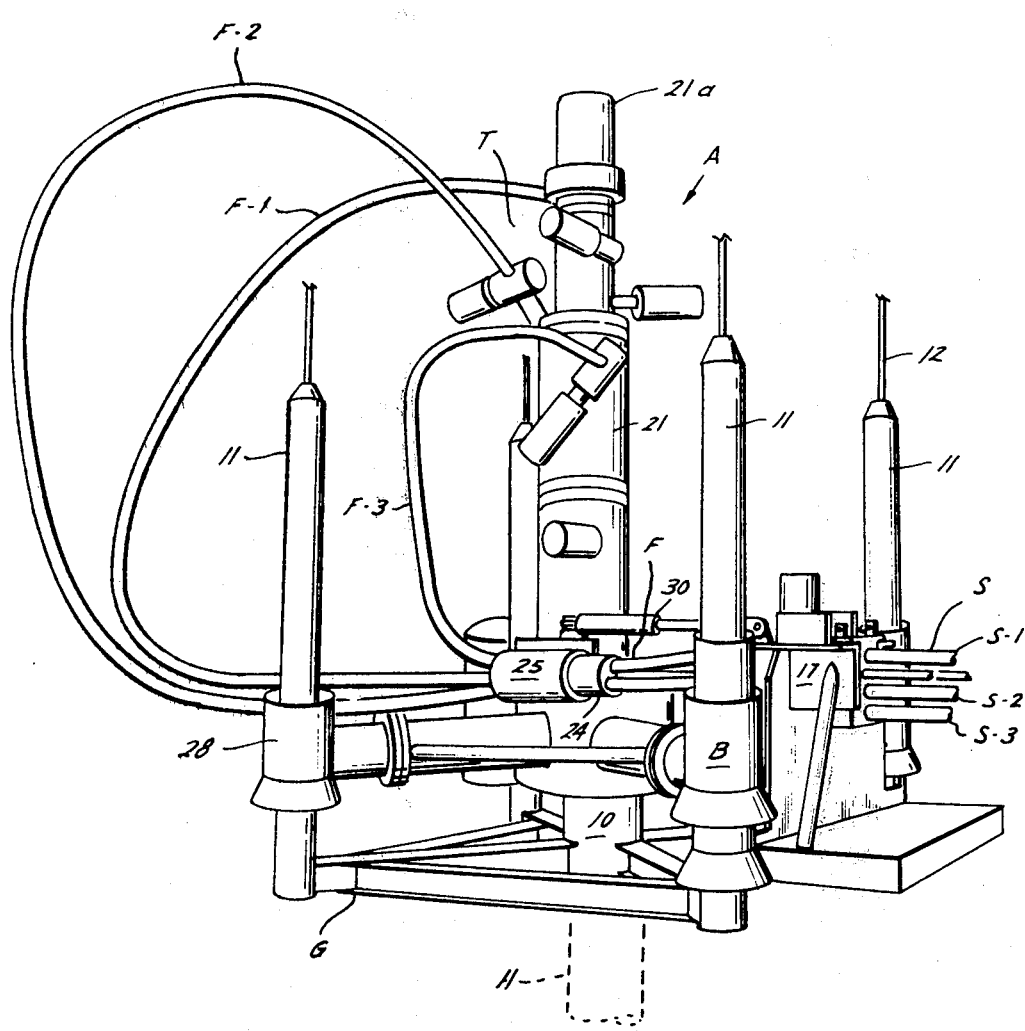
FIG. 1 is an isometric view of the completed underwater connection made between the Christmas tree and the storage flowline according to the preferred embodiment of this invention.
Figure 6:
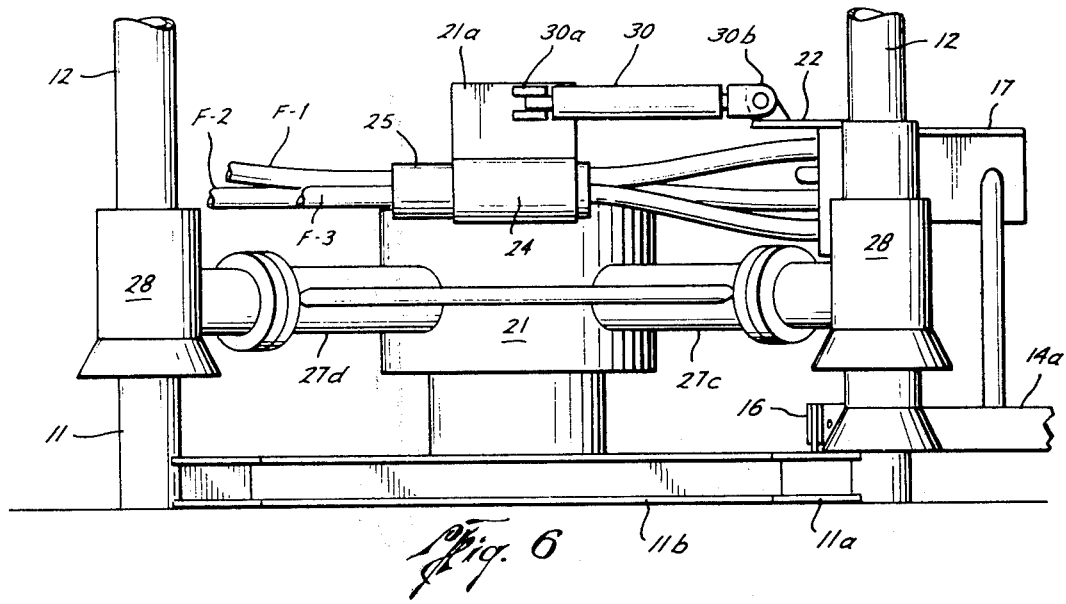
FIG. 6 is a side view of the well fluid flow control network or Christmas tree having been landed onto the well guide structure and the flowline alignment assembly.

The connection of the tree flowline flange 22 with the seal plate assembly 23 and the storage flowline flange 40 by the connection means 26 completes the fluid connection between the Christmas tree T and the storage flowline S such that oil fluid can be transferred from the well to a storage area. After the flanges 22 and 40 have been interconnected in a sealed relationship, the flowline pulling tool P may be removed along the guidelines 12 thereby leaving the apparatus as illustrated in FIG. 1.

It may be desirable from time to time to inspect, repair or replace the sealing plate assembly 23 which makes the sealed, fluid connection between the flowline flanges 22 and 40. The seal plate assembly 23 can be removed by means of the removal tool 90b illustrated in FIGS. 25 and 26. First, hydraulic fluid under pressure is applied to the connection means chamber 27d above the stationary piston 27a in order to move upwardly the movable cylinder 27b thereby moving the connector side plates 26a and 26b upwardly to the upper, release position. In the release position, which is also the position which allows connection of the two flanges, the recess 26f in the connector side plates 26a and 26b is aligned with the storage flowline flange lug 40g such that the connector plates 26a and 26b as well as the flange 22 can be moved away from the flange 40. Movement of the tree flowline flange 22 away from the storage flowline flange 40 is accomplished by actuation of the hydraulic power assembly 30 which moves the tree flowline flange 22 in the direction of arrow 93 thereby backing the tree flowline flange away from the storage flowline flange. Of course, all of the movement of the flange 22 is within the confines of the alignment channel 17 at this point.

After the tree flowline flange 22 has been moved away from the storage flowline flange to the position illustrated in FIG. 25, the removal tool 90 is lowered downwardly on any suitable running tool and is positioned in between the two flanges 22 and 40. The running tool 90 includes a tapered pin 90a which is tapered for insertion into a bore 90g on the seal plate body 23a. The running tool 90 further includes a latch means 91 which includes two side latch members 91a adapted to latch over side lugs 23n which extend outwardly from the side of the seal plate member 23a.

The latch members 91a are pivotally mounted onto removal tool body 90b by suitable pin connections at 91b. The latches 91a extend outwardly in a lateral direction toward the seal plate assembly 23 and include removal shoulders 91c and 91d which are machined in the bottom portion of the latches. The latches 91a are maintained in the substantially lateral position by pins 90c which extend outwardly from the sides of the removal tool body 90b.

In order to remove the seal plate assembly 23, the hydraulic power means 30 is actuated to move the tree flowline flange 22 backwardly away from the storage flowline flange 40. After the tree flowline flange 40 has been moved to the position illustrated in FIG. 25, the removal tool 90 is inserted between the two flanges 22 and 40.

With the removal tool 90 positioned between the tree flowline flange 22 and the storage flowline flange 40 the hydraulic power assembly 30 is actuated to move the tree flowline flange 22 toward the removal tool 90 and the storage flowline flange 40. The flange 22 is moved into a position of engagement with the removal tool 90 such that the alignment pin 22j is inserted into the corresponding bore 90a in the removal tool body 90b. The latches 91a are moved over the seal plate side lugs 23n as the power assembly 30 moves the flowline flange 22 and seal plate assembly 23 into engagement with the removal tool 90. The latching surfaces 91c and 91d are moved upwardly and over the side lugs 23n into a position of hooked engagement therewith.

The hydraulic cylinder assembly 30 is then actuated to remove the tree flowline flange 22 rearwardly again in the direction of arrow 93. As the tree flowline flange 22 is moved backwardly by the power of the hydraulic cylinder assembly 30, the latches 91 hold the tree plate member 23 with the removal tool thereby causing a shearing of two shear pin connections 94 (FIG. 9) between the flowline flange member 40a and the tree plate body 23a. The shear pin connections 94 include a first connecting pin member 94a which actually connects the tree plate body 23a to the tree flowline flange member 22a. A resiliently urged shear pin 94b is urged resiliently into a groove in the connector pin 94a. Retention of the seal plate body 23a with the latches 91a causes a shearing force to be directed onto the shear pins 94b thereby causing them to shear and releases the connection between the tree flowline flange member 22a and the seal plate body 23a. This frees the seal plate assembly 23 for removal with the removal tool. The removal tool 90 maintains a hold on the seal plate assembly 23 by a combination of the latch members 91a and the pin 22j inserted in the removal tool body 90b. Another seal plate assembly 23 can be run along a suitable running tool and inserted between the tree flowline flange 20 and the storage flowline flange 40 by reversing the steps of the removal process just described.

SUMMARY OF OPERATION

The apparatus A of this invention is utilized to make a sealed, fluid connection between a Christmas tree T located on a subsea well and an underwater flowline which has been laid to the side of the well. The summary of operation including the method of making the connection between the well and the storage area located at a remote point can be summarized as follows.

After the well has been drilled and it has been determined that the well is a desirable producer, a flowline guide structure G can be lowered downwardly from the surface vessel V and mounted onto the well in order to provide a guide system along the guidelines 12 extending to the surface vessel for the various operations to follow. After a determination has been made of the direction of approachment of the storage flowline S to the well, the flowline alignment assembly B is lowered along two of the guidelines 12 and onto two adjacent guide posts 11 which will face the flowline S when laid. The flowline alignment assembly B is run downwardly utilizing the flowline positioning assembly or pulling tool P of this invention. After the flowline alignment assembly B is suitably landed on the guide structure and latches 16 have latched onto frame members 11a of the guide structure, the hydraulic cylinder release 68 can be actuated to release the latch 69 from the channel member 14b so that the flowline pulling tool P can be returned to the surface.

The Christmas tree T is then run along the guidelines 12 into position on the guide structure G and the flowline alignment assembly B. The Christmas tree T is positioned such that the tree flowline flange 22 is inserted into the alignment channel 17 between the alignment channel members 17a and 17b. The curved flowlines F-1, F-2 and F-3 are mounted for slidable movement at their end portions by means of the hub 24 mounted in the guide sleeve 25. This even allows some axial movement of the flowlines and the flowline flange 22 as the flowline flange is seated between the alignment members 17a and 17b, if necessary.

The storage flowline S is now laid from the lay barge L downwardly to the flowline alignment assembly B. A wireline W is connected to the probe unit 43 as the flowline is laid underwater. The wireline W extends to the surface vessel V and through the funnel assembly 65 of the flowline pulling tool P, which is at this point landed on the flowline alignment assembly B. The procedure for brining the flowline S adjacent to the flowline alignment assembly B and pulling tool P may be varied if desirable. The flowline pulling tool P is then lowered along the guidelines 12 onto the flowline alignment assembly B and is seated thereon. At this point, the wireline W extends from the probe unit 43, through the funnel sections 65a and 65b, through the locking tube 75a and along sheaves 77a, 77b and 77d upwardly to the surface vessel (through the drillpipe running tool 64) and is connected to a suitable wireline control means on the surface vessel. This wireline control means is then operated to pull the wireline W thereby moving the probe unit 43, the landing assembly 41 and the storage flowline flange 40 attached therewith inwardly toward the funnel assembly 65 until the nose portion 43a is latched into the locking sleeve 75a by the latch members 75c.

Hydraulic force is then applied through the hydraulic cylinder assembly 76 to move the locking tube 75 rearwardly out of the funnel section 65 thereby pulling in the landing cylinder 42f and landing the landing flange 42c onto the funnel landing section 65b with the landing pins 42d and 42e inserted into landing bores 65d and 65e. As the probe unit 43 is moved inwardly, the vertical aligning pin 43f will be engaged by one of two helical surfaces 49 which terminate at the rear top 65c of the funnel section 65a. Thus, if the flowline flange 40 is not in a vertical position, the alignment pin 43b on the probe body 43a will be engaged by one of the helical grooves and gradually rotated to a vertical position. The pivotal connection between the probe body 43a and the connector pin nut 42i allows the probe unit and landing flange assembly to be pulled into the funnel sections 65a and 65b even if the probe unit 43, landing flange assembly 42, flowline flange 40 and the flowlines S-1, S-2 and S-3 are as much as 30° out of alignment with the alignment channel members 17a and 17b.

After the landing flange assembly has been locked with the funnel sections 65a and 65b as illustrated in detail in FIG. 14, hydraulic power cylinders 74 are tilted to the downwardly tilted position of FIG. 15 where the landing notches 80 land onto and seat against the landing corners 80a and 80b on the alignment channels 17a and 17b, respectively. The storage flowlines S-1, S-2 and S-3 are now moved to a substantially horizontal position if not already in such horizontal position. With the landing notches 80 on the carrier assembly landed onto the alignment channels and the flowlines in a horizontal position, the vertical dogs 45a are inserted into the vertical portions of the substantially T-shaped recesses 17c and 17d in the alignment channel members 17a and 17b.

The flowlines S-1, S-2 and S-3 are then independently tested utilizing the flowline testing assembly 50. After it has been determined that the flowlines are free of obstruction, the flowline testing assembly 50 and the landing flange assembly 42 are released from connection with the storage flowline flange 40 by the releasable connection means 51 illustrated in the connect position in FIG. 18 and in the release position in FIG. 20.

It might be mentioned that the horizontal dogs 45b extending outwardly from the storage flowline flange member 40a are held inwardly by the retention ears 50e on the side plates 50c of the testing flange assembly 50 until the testing flange assembly 50 is removed. The reason for the retention of the horizontal dogs 45b is to provide for removal of the storage flowline flange 40 in the event of any problem. Of course, once the horizontal latch dogs 45b have been released for insertion into the horizontal portions of the T-shaped slots 17c and 17d, the flange member is substantially locked in position and cannot be removed without additional effort.

After release by the releasable connection means 51, the entire pulling tool P is pulled upwardly thereby pulling the testing flange assembly entirely off the flowline flange. The hydraulic cylinders 74 are then actuated to pivot the funnel assembly to an upwardly tilted position in order to move the testing flange assembly 50 out of the way. The pulling tool is then re-landed onto the flowline alignment assembly B.

Referring to FIGS. 8–9 and 23–24, the hydraulic cylinder 30 is actuated to move the connection means 26 into such a position that the connector plates 26a and 26b can be moved downwardly to the connected position over the storage flowline flange lugs 40h and 40i as previously described. This completes the connection between the storage flowlines S-1, S-2 and S-3 with the tree flowlines F-1, F-2 and F-3.

It should be understood that the apparatus of this invention can be utilized to connect any number of flowlines, although only three have been described on the Christmas tree T and the storage flowline S in the embodiment described herein. The apparatus A of this invention is particularly suited for making fluid connections at depths underwater where divers cannot operate. However, it should be understood that the apparatus A may be utilized at any depth. The source of hydraulic power has been generally described as being situated on the surface vessel V. It should be understood that portions or all of the hydraulic power may actually be provided on the parts of the apparatus A positioned on the well, if desired.

The foregoing disclosure and description of the invention are illustrative and explanatory thereof, and various changes in the methods, procedures and techniques, as well as in the details of the various illustrated steps may be made without departing from the spirit of the invention. For example, the guide structure G has been disclosed as requiring using guidelines 12 for lowering the various tool assemblies disclosed here. It should be understood that the other guide structures can be used to guide some part or all of the equipment from the surface to the well.

I claim:

1. Apparatus for testing two or more underwater flowlines, comprising:

first and second flowlines extending from the surface of a body of water and terminating in a flowline flange which receives and supports end portions of said first and second flowlines; and a testing flange assembly mounted onto said flowline flange and including a passageway therein which is in fluid communication with said supported end portions of said first and second flowlines for providing fluid communication therebetween.

2. The structure set forth in claim 1, including:

a first test object of one particular shape being positioned in said passageway for making an impression on a test specimen pumped through said first flowline to said testing flange assembly.

3. The structure set forth in claim 2, including:

a second test object of another particular shape being positioned in said passageway for making an impression on a test specimen pumped through said second flowline to said testing flange assembly.

4. The structure set forth in claim 1, including:

said testing flange assembly passageway being alinged with said first and second flowlines;

a first test object being mounted in said passageway in alignment with said first flowline for making an impression on a test specimen pumped through said first flowline; and a second test object having a shape different from said first test object and being mounted in said passageway in alignment with said second flowline.

5. The structure set forth in claim 1, wherein said testing flange assembly includes:

a central body portion having said passageway therein; and side body segments connected with said central body portion and having recesses therein for engaging ridges on said flowline flange for removably mounting said testing flange assembly onto said flowline flange.

6. The structure set forth in claim 1, including:

a carrier assembly attached to said flowline flange and to said testing flange assembly for manipulating said flowline flange to a desired position; and releaseable mounting means for releasing said carrier assembly from attachment with said flowline assembly with said carrier assembly remaining attached to said testing flange assembly.

7. The structure set forth in claim 1, including:

said flowline flange having yieldably mounted detent members thereon for maintaining said flowline in a desired position; and said testing flange assembly including retention means for holding said detent member in a depressed position with said testing flange assembly being mounted on said flowline flange.

8. The structure set forth in claim 6, including:

pivotal means mounting said testing flange assembly for pivotal movement with respect to said carrier assembly.

* * * * *